United States Patent

[11] 3,568,160

[72] Inventor Anthony R. Talarczyk
Bloomington, Minn.
[21] Appl. No. 756,830
[22] Filed Sept. 3, 1968
[45] Patented Mar. 2, 1971
[73] Assignee Sperry Rand Corporation
New York, N.Y.

[54] ACCESS CONTROL FOR PLURAL MAGNETIC MEMORIES
8 Claims, 38 Drawing Figs.

[52] U.S. Cl. .......... 340/172.5
[51] Int. Cl. .......... G06f 13/00
[50] Field of Search .......... 235/157; 340/172.5

[56] References Cited
UNITED STATES PATENTS

| | | | |
|---|---|---|---|
| 3,230,513 | 1/1966 | Lewis | 340/172.5 |
| 3,231,862 | 1/1966 | Blosk et al. | 340/172.5 |
| 3,292,151 | 12/1966 | Barnes et al. | 340/172.5 |
| 3,317,902 | 5/1967 | Michael | 340/172.5 |
| 3,343,140 | 9/1967 | Richmond et al | 340/172.5 |
| 3,432,810 | 3/1969 | Cordero | 340/172.5 |
| 3,437,998 | 4/1969 | Bennett et al | 340/172.5 |
| 3,469,241 | 9/1969 | Barton et al. | 340/172.5 |

*Primary Examiner*—Gareth D. Shaw
*Assistant Examiner*—Melvin B. Chapnick
*Attorneys*—Thomas J. Nikolai, Kenneth G. Grace and John P. Dority

ABSTRACT: An access control system for handling a plurality of types of addressable-memory systems is described. Memory devices of varying types and having varying addressing systems are controlled and can be coupled to a single data processor input/output channel. The access control system described includes circuitry for responding to selected fields of control words for establishing the length and bit positions of other control fields in the control words.

INVENTOR
ANTHONY R. TALARCZYK

BY Charles A. Johnson
ATTORNEY

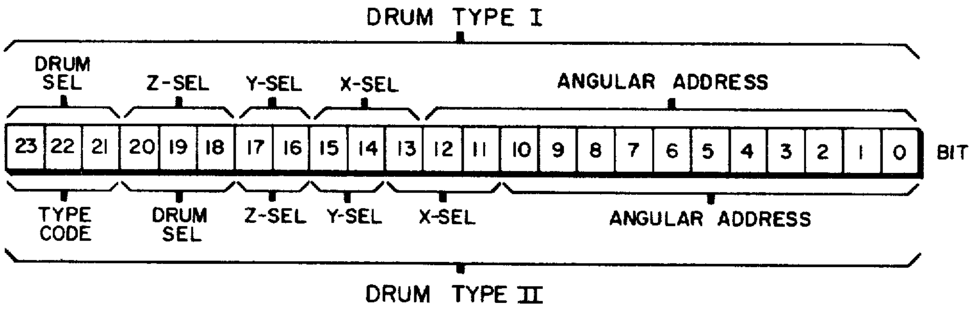
Fig. 2
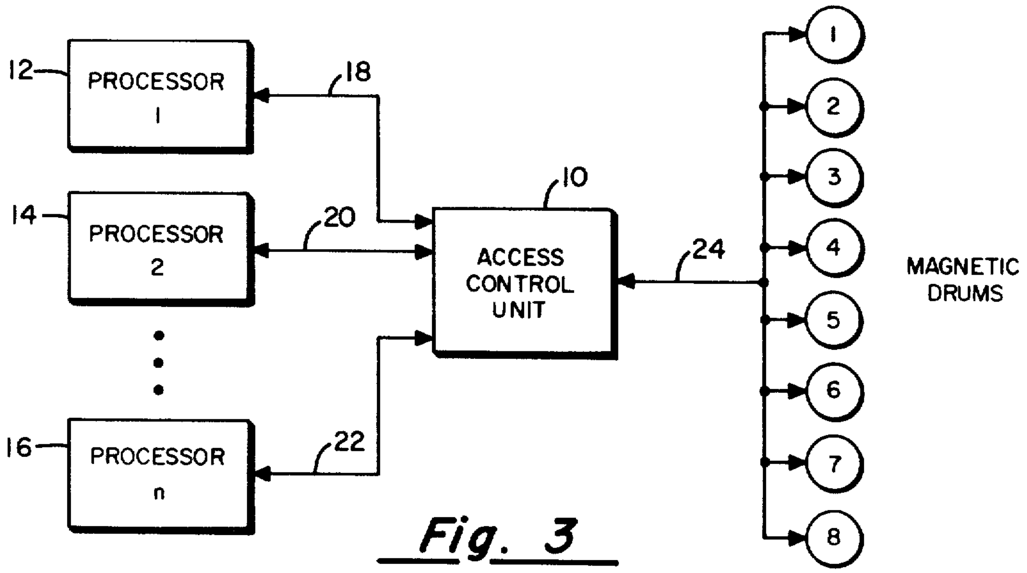
Fig. 3
| OPTION | TYPE CODE | DRUM TYPE | ADDRESS ALLOCATION |
|---|---|---|---|
| 1 | P=0 | II | 0 → 7,777,777 |
| | P=1-7 | I | 10,000,000 → 77,777,777 |
| 2 | P=0-6 | I | 0 → 67,777,771 |
| | P=7 | II | 70,000,000 → 77,777,777 |
| 3 | P=0-7 | I | 0 → 77,777,777 |
Fig. 4
TYPE I CAPACITY = 2,097,152 WORDS
= $10,000,000_8$
TYPE II CAPACITY = 262,144 WORDS
= $1,000,000_8$

= LOW = LOGICAL 1 = −4.5V

= HIGH = LOGICAL 0 = 0V

PATENTED MAR 2 1971

SHEET 09 OF 23

3,568,160

PATENTED MAR 2 1971 3,568,160

SHEET 12 OF 23

ACCESS CONTROL FOR PLURAL MAGNETIC MEMORIES

BACKGROUND OF THE INVENTION

1. Field Of The Invention

This invention relates generally to control circuitry for use with a data processing system having several types of storage devices, whereby a single control system can interconnect selected ones of the types of memory devices to a single input/output channel of a data processor in the data processing system. In this context, the control signals received from the data processor provide the selection criteria to the access control system for making the selection between the various types of storage devices.

2. Description Of The Prior Art

It is common in data processing systems of the prior art to provide a computer (data processor) with a plurality of input/output communications channels, and to couple various peripheral devices to the various channels. It has also been common in the prior art data processing systems, to couple a control unit for controlling a plurality of like-kinds of peripheral equipment to a single input/output channel, whereby the data processor can communicate with a selected one of the plurality of devices. The latter system provides a degree of flexibility over the first described system, in that greater capacities of data can be handled by the addition of the control circuitry, without the expense of the addition of many more input/output channels that would be required in the first described system. The peripheral devices can be storage devices, such as magnetic drums, magnetic discs, magnetic-tape units, auxiliary matrix memories, or the like; recording devices such as line printers, typewriters, card punches, paper-type punches, or the like; input devices such as card readers, paper-tape readers, or the like; and display devices such as cathode-ray tube displays and the like. It has been found in most prior art systems that the combination of two or more of the foregoing categories of peripheral equipment and often combinations of many of each, are desired for the full utilization of the computational capacity of the data processing system. Normally, each of the categories of peripheral equipment require a separate control device for selecting the particular unit to be coupled to the input/output channel, and for providing formatting of the data flow and synchronization of the respective equipment rates.

The prior art has also established that each of the categories of equipment mentioned have been provided with several types of individual units within the general category grouping. These types of units have been found to vary in such characteristics as data-word size, operational rate, data-storage capacity, data-addressing requirements, and the like. These characteristic differences between like kinds of peripheral equipment have often necessitated the design of special control circuitry for each of these characteristic types. For instance, in the prior art, two different types of magnetic drum systems would require two different control circuits, thus requiring the use of two input/output channels to the data processor. This lack of flexibility can be seen to be expensive, in that, in order to have the two types of magnetic drum systems available in the data processing system, it is necessary to duplicate many features found in the control circuitry and to tie up two input/output channels of the data processor. It is to this type of inefficiency in the use of the input/output channels of the data processor and the duplication of control circuitry that this invention is directed.

SUMMARY OF THE INVENTION

It has been found that by the addition of a relatively small amount of control circuitry that a large part of the control circuitry can be utilized to control more than one type of peripheral equipment, such as several types of magnetic drum systems. The addition of this control circuitry allows the access control system of this invention to respond to programmable control words having function codes which define the type of peripheral equipment that is to be utilized, and identifies the particular one of the type selected. In response to this programmable selection, the access control system functions to modify the control paths within itself, such that the various data-word formats and various addressing requirements between the different types of peripheral equipments is selected. Thus, several types of drum systems can be controlled by a single access control system, and can all be accessed by a single input/output channel.

A primary object of this invention, then, is to provide an improved access control system for use in a data processing system for controlling plural types of peripheral equipment. Yet another object of this invention, is to provide an access control system for programmably coupling selected ones of different types of memory devices to a single input/output channel of a data processor. Yet another object of this invention, is to provide an access control system responsive to programmable control commands from a data processor for selecting one of a plurality of types of magnetic storage devices, and accommodating the addressing formats for the selected type of device.

BRIEF DESCRIPTION OF THE DRAWINGS

The foregoing mentioned general objectives of the invention, and other more detailed and specific objective, will become apparent from the consideration of the following descriptive material when viewed in light of the drawings in which: FIG. 2 is an illustration of the bit arrangement of the control words for selecting between two types of magnetic drum systems; FIG. 3 is a general block diagram illustrating a plurality of processors coupled to a single access control unit for controlling a plurality of magnetic drum systems; FIG. 4 is a table illustrating various address allocation options for two types of magnetic drum systems when used in conjunction with this invention.

DESCRIPTION OF THE PREFERRED EMBODIMENT

Introduction

Figure 1:
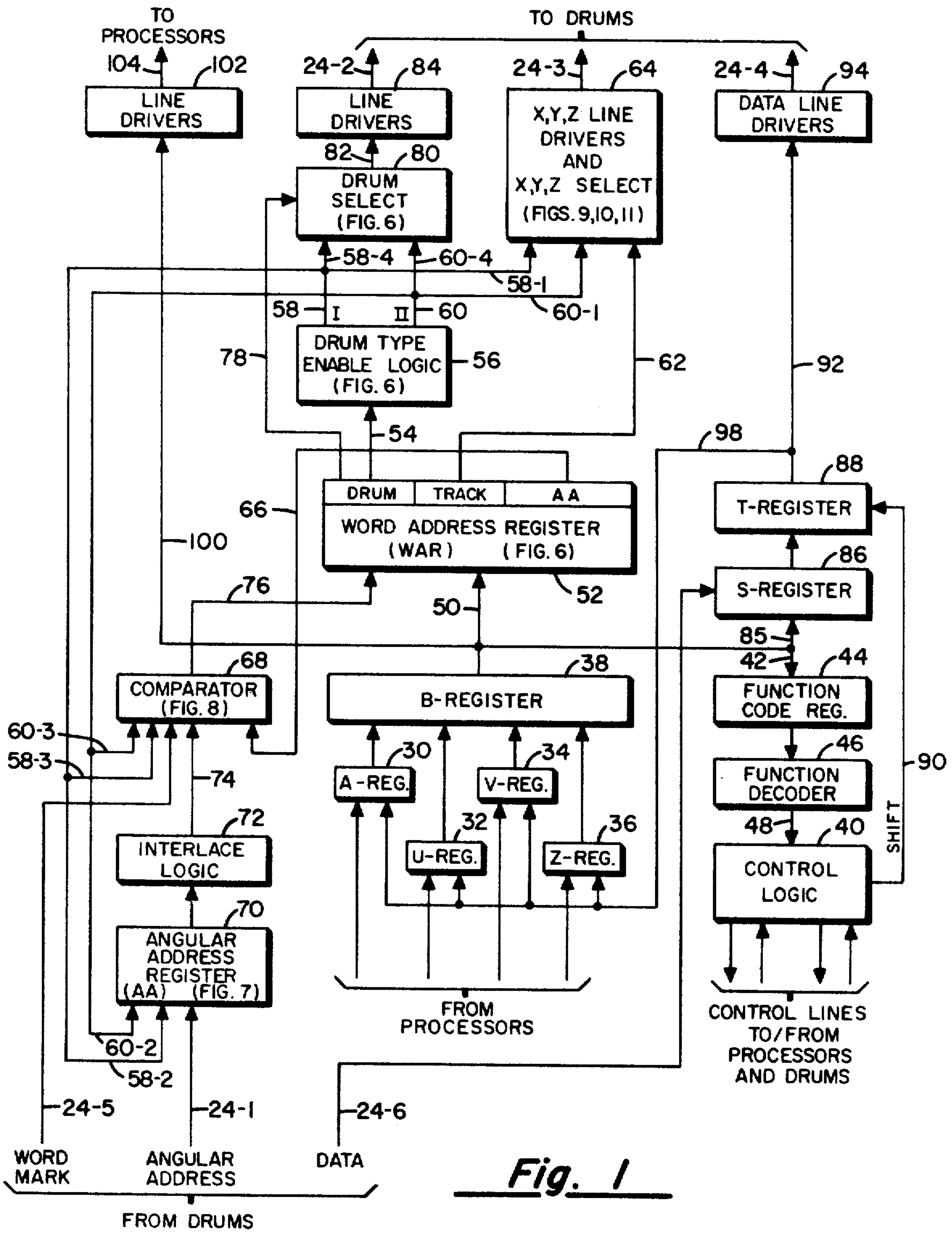
FIG. 1 is a block diagram of the access control system of this invention.

This invention finds particular application in electronic data processing systems. Data processing systems often utilize digital electronic computers to manipulate information signals represented and stored in the form of digitized data signals. These data signals are often in the binary number system where it is necessary only to distinguish 1's and 0's. One technique for storing data signals employs magnetizable material disposed on a movable surface. Some of these surfaces are formed in the shape of a cylinder and are made part of rotatable drum assemblies. These rotatable surfaces are normally each coated with a magnetizable material to form a layer which can be readily magnetically altered in discrete areas. After the surface is magnetically coated, it is often referred to as a record member. In the binary number system, the individual binary digits are commonly referred to as bits. A common form of recording format is one that has discrete portions of the magnetizable surface magnetized to one state of magnetic remanence for a binary 1, and in the opposite state of magnetic remanence for a binary 0. Various other forms of recording systems are well-known in the prior art. In order that the recorded data is readily available, transducers referred to as reading heads are arranged around the periphery of the movable surface and the record member is rotated, or moved at high speeds past the reading transducers. Transducer members have magnetic flux-defining pole pieces, generally referred to in the art as read/write heads, which normally cooperate with the data-storage device to transmit data signals to be stored magnetically on the surface, and to read stored data signals from the surface. The position of each such head is used to define a track on the drum surface. These tracks can be grouped to define areas on the magnetizable surface that are referred to as bands or channels. As a selected area passes a selected transducer, information is read therefrom, or stored thereon, by the activation of the transducer which is disposed in a close proximity to the magnetizable surface, but out of contact therewith.

It is common in the prior art magnetic storage devices, including drum systems to provide as a minimum, prerecorded timing signals on the magnetizable surface, thereby providing a means for synchronizing the reading and recording on the surface, with a source of timing pulses that is formed by the same surface. The timing signals can be in the form of prerecorded timing pulses, or can be derived from knurled timing tracks, or any other well-known timing-track recording technique.

It has also been found in the prior art, that when more than one drum system is to be utilized as a part of a total memory system to be controlled by a single control circuit, that it is desirable to provide addressing signals on the surfaces of the various drums. These addressing signals are commonly referred to as "Angular Address" signals, and define the various addressable locations on the periphery of the magnetizable surface. These prerecorded Angular Address systems are desirable, in that the control unit can read the recorded Angular Address signals and compare them to a desired Angular Address, for activating the reading or recording operation upon the detection of coincidence. It is also common in the prior art drum systems that the various drum surfaces be provided with one or more sector marks, referred to as "word mark" pulses, thereby defining the starting or ending-location of recorded data words.

It will be understood that various specific types of magnetic storage devices including drum systems, will have various arrangements as to the physical arrangement of the data-word storage and the control-signal storage on the magnetizable surface. The different formats result in requirements of different addressing-signal arrangements as well as different drum system selection signal requirements.

This invention is aimed at accommodating the various types of format requirements for handling various types of magnetic storage devices with a single access control circuit, whereby the various types of storage devices can be accessed and accommodated to a single input/output channel of a data processor.

Conventions Employed

Throughout the following description, and in the accompanying drawings, there are conventions employed that are familiar to those skilled in the art. Additional information concerning these conventions is set forth here. In the block diagram figures, a conventional full arrowhead is employed on lines throughout the drawings to indicate (1) a circuit connection, and (2) the direction of pulse travel, which is also the direction of control. In the logic diagram figures a conventional filled half-arrowhead is employed to indicate (1) a circuit connection, and (2) a logical 0 signal impressed on the line to achieve a desired output signal. A logical 0 signal for this embodiment is a "high" signal and is approximately ground potential. A conventional unfilled half-arrowhead is employed in the logic diagrams on lines to indicate (1) a circuit connection, and (2) a logical 1 signal impressed on the line to achieve a desired output signal. For this embodiment, a logical 1 signal is a "low" signal and is approximately −4.5 volts.

Bold-face characters appearing within a logic block diagram symbol identify the common name for the circuit represented; that is, a common bistable flip-flop is identified as FF, a toggle flip-flop is identified by TFF, a logical AND circuit is identified as A, and a logical OR circuit is identified as OR. In addition to the bold-face characters just enumerated for illustrative purposes, associated numerical designations will identify the stages of the circuit identified by the bold-face character for registers, or the rank of logic.

The logic circuits utilized to embody this invention are available commercially, and can readily be selected by those skilled in the art. Many of the circuits illustrated in the logic diagrams of this invention can be selected from those illustrated in U.S. Pat. No. 3,355,718, to A. R. Talarczyk, entitled "Data Processing System Having Programmably Variable Selection for Reading and Recording Interlaced Data on a Magnetic Drum," Ser. No. 478,885, issued Nov. 28, 1967, and assigned to the Sperry Rand Corporation, the assignee of this invention.

In the description, the general arrangement of the apparatus will be first described with respect to the manner to which the various circuit components and the apparatus are interconnected and in respect to the general overall operation which is performed. The description of the general arrangement will be followed by separate and more detailed description of the various logical arrangements and circuitry which so require it, to particularly point out the operation of the invention within this embodiment. It should be understood that various portions of the access control circuit that do not particularly pertain to this invention have been eliminated from this discussion in order to clearly set forth the inventive concept.

Illustrative Drum System Types

The inventive concepts of the access control system can be extended to various kinds of peripheral equipments, as mentioned above. For purposes of illustration, two types of magnetic drum systems will be described to illustrate the enhanced capability of the data processing system that results with the use of this invention. In order to fully appreciate the versatility that this invention renders possible, a brief description of two types of characteristic magnetic drum systems which can be controlled by the access control circuit of this invention will be set forth. Type I will be considered to be a large mass-storage drum system capable of storing 2,097,152 30 or 36 bit data words, with an average access-time of 17 milliseconds and a maximum access-time of 34 milliseconds. A mass-storage drum system of this type is available commercially from the Univac Division of Sperry Rand Corporation, and is identified as the FH 1782 drum system. A second type of drum system will be referred to as a Type II Magnetic drum system and will have the primary capability of storing 262, 144 30 or 36 bit data words. The Type II drum system is of a relatively smaller storage capacity, but of a much shorter access-time than the Type I drum system. The Type II drum system has an average access-time of 4.3 milliseconds with a maximum access-time of 8.6 milliseconds. The Type II drum system is also available from the Univac Division of Sperry Rand Corporation, and is identified as an FH 432 magnetic drum system. The advantages of the utilization of combinations of these types of drum systems on a common input/output channel and under control of a single access control circuit is readily apparent to those skilled in the use of data processing equipment. It is not felt that further detail concerning the actual magnetic drum systems would be helpful at this time for an understanding of the invention. Specific references to operational features of the respective magnetic drum systems will be made at the points of the discussion where it will be helpful in an understanding of the operation of the control circuitry of this invention.

Data Processing System

Turning briefly to a consideration of FIG. 3, which is a block diagram of a data processing system in which the subject invention could find use, there is shown an Access Control Unit 10 coupled to Processors 12, 14, and 16. These Processors can be selected from several commercially available types, and by way of example, UNIVAC 1108 processors, available commercially from the Univac Division of Sperry Rand Corporation can be used. The input/output cables 18, 20, and 22 are utilized for receiving external function control words from the Processors, and for carrying data to be stored in the magnetic drum systems, and for carrying data read from the magnetic drum systems. The Access Control Unit 10 is also coupled to a plurality of magnetic drum systems illustrated as drums 1 through 8 by cables 24. It will be noted that there is a mixed selection of the magnetic drum systems that can be utilized with the Access Control Unit 10. A minimum configuration would have either one Type I drum system or one Type II drum system coupled to Access Control Unit 10. The total number of drum systems can be utilized in this embodiment, cannot exceed eight. The numbers of the various drum system types that can be used will depend upon the number of bit positions available for addressing.

A brief reference to FIG. 4 will illustrate the options that are available in this embodiment. The Type Code provides the selection of the address allocation for the types of drum systems according to the option selection. The option is selectable by making switch settings or by utilizing various alterable wiring configurations in a portion of the Access Control Unit. This selection will be described in more detail below. At this point, it is sufficient to say that the selection of Option 1 will permit a mix of up to seven Type I drum systems and up to seven Type II drum systems, it being understood that a maximum of eight drum systems can be selected. Option 2 would also permit a mix of up to seven Type I drum systems and up to seven Type II drum systems, but with the addressing ranges altered as shown. For example, if three Type I drum systems are selected, then five Type II drum systems would be all that could be used. Option 3 allows up to eight Type I drum systems.

Addressing of all Type II drum systems in a system will be continuous, and addressing of all Type I drum systems in the system will be continuous. However, as indicated by fig. 4, Type I drum system addresses are not necessarily a continuation of Type II drum system addresses, nor are Type II drum system address necessarily a continuation of Type I drum system addresses.

In order to initiate operation by one of the Processors, it is necessary that the Processor that is to utilize one of the magnetic drum systems provide two classes of control signals in the total control word. One of these classes of control signals is the external function code signal grouping. Characteristic external function codes include such specified drum operation as write, read, search, boot-strap, etc., and are translated by the Function Decoder, to be described below, for controlling drum system operation. Characteristic types of operations are described in the above identified U.S. Pat. No. 3,355,718, and this operation will not be discussed in detail. The precise function of the drum system is not of primary interest in this invention. Instead, it is to the second class of control signals that the instant invention is primarily directed. The second class of control signals that must be supplied by the processor includes the control signals that specify the drum system that is to be operated upon, the band (channel) in the drum system that is to be utilized, and the Angular Address desired within the specified band. This second class of control signals can be referred to as the addressing control word. While this type of information is common to the two drum system types, and would be common to very nearly any drum system type utilized in a multiple drum system configuration, the precise control-word bit-format is not identical.

Directing attention to FIG. 2, it can be seen that for a Type I drum system, the drum-select portion is in bits 21, 22 and 23, with the band-select (comprised of XYZ portions) included within bit positions 13 through 20. The angular Address portion for Type I drum system is found within bit positions 0 through 12. Next considering a Type II drum system it can be seen that precisely the same classification of control signals are utilized, but that the bit positions are different from that of Type I drum systems. For type II drum systems the drum-select portion is in bits 18, 19 and 20, with the band-select being in bit positions 11 through 17 this leaves the Angular Address portion for Type II drum systems in the bit position 0 through 10. For Type II drum systems in the bit positions 21, 22 and 23, referred to as the Type Code, are not specifically utilized. Therefore, by utilizing these three bit-positions, as described above, in conjunction with FIG. 4, there is provided a means whereby the Access Control Unit 10 can distinguish between the Type I drum system and Type II drum system control-word formats. By the evaluation of bits 21, 22 and 23, together with the option selection described above, the Access Control Unit 10 can be made to recognize the difference in significance of the various bit positions in the addressing control word, as just described. It is the recognition of the difference in significance, together with the response to such recognition, that comprises the main feature of this invention. The following discussion will treat first the logical arrangement of the Access Control Unit, and will then treat the detailed logic arrangements for achieving the preferred embodiment of this invention.

Access Control System.

FIG. 1 is a logic block diagram of that portion of Access Control Unit 10 which is relevant to the discussion of this invention. There are other functions performed in Access Control Unit 10 that do not relate to this invention. These functions are neither discussed nor illustrated herein. The two classes of control words, and the data words are sent from the Processors selectively to registers identified as the A-Register 30, U-Register 32, V-Register 34, and Z-Register 36. The B-Register 38 operates as a temporary holding register for all transmissions of data words and control words both to and from the Access Control Unit 10. The Control Logic 40 operates to control all register transfers within the Access Control Unit, to receive special control signals from the Processors and drum systems, and to send special control signals to the Processors and drum systems. When external function codes are received in the B-Register 38, they are selectively transferred over cable 42 to the Function Code Register 44. The FUnction Code Register operates to temporarily store the external function code, and to direct it as an input to the Function Decoder 46. The operation of the Function Decoder 46 is to emit control signals over lines 48 to the Control Logic 40, thereby establishing the particular functions that are to be performed. As described briefly above, and as described more completely in the above identified patent, the functions can be those available to the various types of drum systems. Since the translation and decoding of these external function codes are not essential parts of this invention, they will not be described in further detail. It should be understood that various function decoders are available in the prior art.

When it is determined that the B-Register 38 has received an addressing control word that is to be used to perform the drum system selection, it is transferred over lines 50 to Word Address Register 52 (WAR). These addressing control words are of the format illustrated in FIG. 2 and described above. Certain of the bit portions in the Word Address Register are directed over line 54 to the Drum Type Enable Logic 56. It is the function of the Drum Type Enable Logic to provide signals indicative of either the Type I drum system selection, as indicated by a signal on line 58, or a Type II drum system selection, as indicated by a signal on line 60. These selection signals that appear on lines 58 and 60 are utilized throughout the Access Control Unit for selectively conditioning various portions of the Access Control Unit to accommodate the different bit configurations for the addressing control words that are utilized for the two types of drum systems. The band-defining bit positions of the Word Address Register are passed over line 62 to X, Y and Z Select and Line Drivers 64. The grouping of bits that will be selected will be dependent upon the receipt of an enable signal on line 58–1, indicative that a type I drum system is selected, or an enable signal on line 60–1, indicative that a Type II drum system is selected.

The Angular Address bit positions specified in the Word Address Register are transmitted on line 66 to Comparator 68. The Comparator 68 operates to compare the specified Angular Address with the Angular Address read from the drum system. The Angular Addresses read from the drum system are received on line 24–1 by an Angular Address Register 70. As the Angular Addresses are received and assembled in Angular Address Register 70, they are transmitted to the Interlace Logic 72. The Interlace Logic can be similar to that described in the above identified Pat. No. 3,355,718 and operates to alter the effective bit positioning of the Angular Addresses and applies the resultant effective Angular Address over line 74 to Comparator 68. Since the two different types of drum systems have different configurations for Angular Address recording, the Angular Address Register 70 will be conditioned for one mode of operation when it is indicated by a signal on line 58–2 that the Type I drum system is selected, and for a second mode of operation when it is indicated by a signal on line 60–2 that a Type II drum system is selected. Similarly, the operation of the Comparator 68 will be affected by the type of drum system selected. Accordingly, a signal on line 58–3 will set Comparator 68 to respond to Type I drum system Angular Addresses, and a signal on line 60–3 will condition Comparator 68 to respond to Type II drum system Angular Address. The word mark received on line 24–5 specifies when the actual comparison is to take place. An enable output signal from Comparator 68 on line 76 operates to indicate by a coincidence signal that the surface of the selected drum is at the Angular Address location selected for either reading or recording. This coincidence signal is utilized to control other circuits (not shown) in the Access Control Unit.

The drum-select bits of the Word Address Register 52 are also transmitted over lines 78 to the Drum Select circuitry 80. In response to these signals, and to the appropriate select signal received on line 58–4 or 60–4, the Drum Select circuitry 80 will enable the appropriate one of lines 82 to select the appropriate ones of Line Drivers 84. Line Drivers 84 provide signals on lines 24–2 to the appropriate drum system thereby selecting it for operation.

When the band is decoded by X, Y, and Z select 64, the XYZ Line Drivers will provide signals on the appropriate ones of lines 24–3 to the selected drum system.

If data is to be recorded, it will be received from the Processors and held at least momentarily in the B-Register 38. At the appropriate time, the data word will be transmitted over line 85 to the S-Register 86. The word held in the S-Register will be directed to the T-Register 88. When the selected drum system has reached the designated Angular Address position as indicated by a compare signal appearing on line 76 from Comparator 68, the T-Register 88 will be caused by the Control Logic 40 to shift in a predetermined manner, as determined by shift signals on line 90, thereby putting bit groupings out on line 92 to the Data Line Drivers 94. The Data Line Drivers 94 will provide the appropriate signals on lines 24–4 the drum or recording.

When the operation specified is to read from a selected drum system, data will be read in a predetermined sequential fashion on line 24–6 to the S-Register 86. The data will not be taken to the S-Register until such time as the occurrence of a word mark pulse on line 24–5 enables the Comparator 68 to compare the Angular Address read over lines 24–1 to the specified Angular Address as it occurs on line 66 and coincidence is found. At the time that it is determined that the selected drum system is at building desired location for reading, the data passes over lines 24–6 to the S-Register 86. The data is assembled in the T-Register 88 and is transmitted over lines 98 ultimately to the B-Register 38. When a word has been read to the B-Register 38, it is passed over lines 100 to the line Drivers 102 for transmission on lines 104 to the appropriate Processor. As indicated, the various internal control signals for data transfers are not shown it being understood that register transfers and the like are under control of the Control Logic 40. The various components described above, will be described in more detail below, and illustrated in the detailed logic diagrams. The foregoing has been intended to illustrate the component relationships and to provide an understanding of their functional interrelationship.

Building Blocks

FIGS. **5*a* through 5*j*** illustrate the various types of building blocks blocks that have been utilized to implement a preferred embodiment of this invention. As indicated above, these circuits can be selected from those readily available in the commercial Marketplace. It is necessary only to aid in the understanding of this invention that the various logical functions of each of these Building Blocks be explained. It is of course plain to those skilled in the art that various other circuits could be utilized for accomplishing the same functional goals of this invention, but by using a somewhat different embodiment.

FIG. **5*a* illustrates a flip-flop circuit. For sake of convenience, the input terminals at the right are denoted as SET, and those terminals at the left are denoted CLEAR. the flip-flop itself is constructed of a pair of cross-coupled inverter circuits of a type well-known in the art. The input logic is performed by well-known diode logic arrangements. For instance, to set the flip-flop, or put it in the condition that it is storing a logical 1, it can be seen that it is necessary to provide a low signal either on the rightmost input terminal, or to provide two low signals on the SET input terminals directed to the AND circuits. These two combinations will be passed through the OR circuit to the 1 input terminal. The occurrence of either of these two conditions will result in the flip-flop storing a 1 whereby a logical 1 (low) signal will be provided at the leftmost output terminal and a high, or logical 0 output signal will be provided at the rightmost output terminal. Once set, the combination of input signals to the SET input terminals will be ineffective to alter the state of the flip-flop. To alter the state it is necessary that the appropriate combination of signals be provided at the CLEAR input terminals. To clear the flip-flop, that is put in a state where it is storing a logical O, it is necessary that two simultaneous low signals be applied to the AND circuit on the CLEAR side, or that a single low signal be applied directly to the OR circuit on the CLEAR input side. This will result in the leftmost output terminal providing a high (logical 0) signal; and the rightmost output terminal providing a low (logical 1**) output signal.

FIG. **5*b*** is the logical block diagram for a circuit that will provide the negation function, commonly referred to as NOT. It can be seen that a high on the input terminal will result in a low at the output terminal. The alternative is true also, in that a low on the input terminal will result in a high on the output terminal.

FIG. **5*c*** illustrates a logical circuit that functions to provide a high output terminal if either the right or left AND-input circuits have all low signals applied thereto. In the event that both AND-input circuits have at least one high signal applied to them, the output from the circuit will be a low signal.

FIG. **5*d*** illustrates the logical function of a circuit that will provide a low output signal if either of the input signals is a high. In the event that both of the input signals are low, the output signal will be high.

FIG. **5*e*** illustrates a logical circuit wherein a high output signal will be derived only when all input terminals are provided with a low signal. A high on any input terminal will result in a low output signal.

Figure 5A:
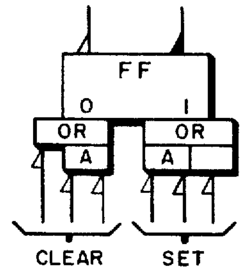
FIGS. 5*a* through 5*j* illustrate logic block diagram symbols utilized in the detailed description of this invention.
Figure 5B:
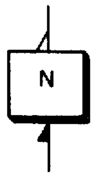
Figure 5C:
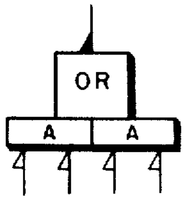
Figure 5D:
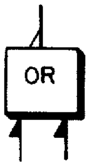
Figure 5E:
Figure 5F:
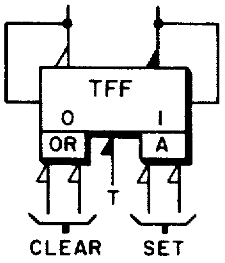

FIG. 5f is the block representation of a toggle flip-flop. The flip-flop operation is similar to that described for the circuit of FIG. 5a, but this circuit has the additional function of altering its output state irrespective of its initial condition upon the application of a high signal on the T input terminal.

Figure 5G:
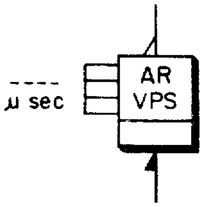

FIG. 5g illustrates a block representation of a variable pulse source. At the left of the circuit there will be shown a numerical value indicating the number of microseconds that a pulse will be available following the application of an input signal. When a high signal is applied to the input, it enables the variable pulse source, thereby providing a low output signal for the duration indicated at the left of the symbol.

Figure 5H:
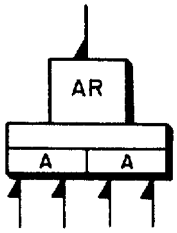

FIG. 5h illustrates the block representation of a driver, and it can be seen that when all of the inputs to either of the AND circuits are high, the output signal will be high.

Figure 5I:

FIG. 5i illustrates an AND circuit that operates to provide a low output signal only when all of the input signals are high.

Figure 5J:
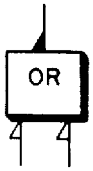

FIG. 5j illustrates an OR circuit that will provide a high output signal when either of the input terminals is receiving a low signal.

For all of the foregoing description, it should be clear that the numbers of input terminals for the various circuits are arbitrarily set and that in the actual embodiment more or less input combinations will be used. Note also that AND will be shortened to A in the logic diagrams.

Word Address Register

Figure 6:
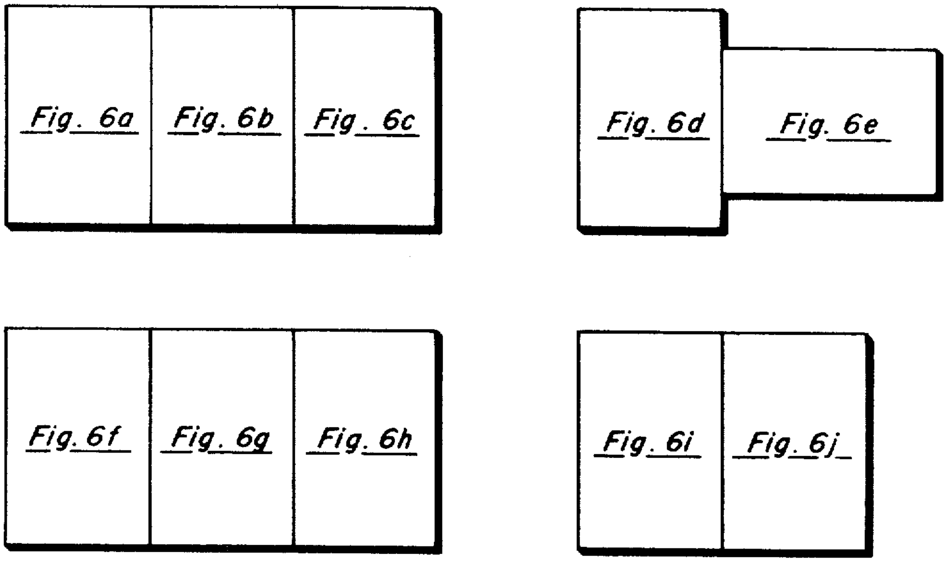
FIGS. 6*a* through 6*j*, when arranged as shown in FIG. 6, are a logic block diagram of the word address register and the selection circuitry for distinguishing between types of drum systems; FIGS. *7a* and *7b*, when arranged as shown in FIG. 7, are a logical block diagram of the Angular Address register.

FIGS. 6a through 6j when arranged as shown in FIG. 6, illustrate the arrangement of the Word Address Register 52. It will be recalled from the discussion of FIG. 1, that the Word Address Register, referred to generally as 52, receives input signals from the B-Register 38. These input signals are shown labeled on the input lines. The basic part of the Word Address Register is comprised of a plurality of toggle flip-flops numbered W–00 through W–28. It will be noted in the designation of the toggle flip-flops that the right-hand and left-hand portions, identified above as SET and CLEAR respectively are distinguished by a 1 or 0 in the circuit designation. For example, referring to the 23rd toggle flip-flop, it can be seen that the SET side is identified W–123 while the CLEAR side is identified as W0023. This convention is carried throughout the logic. The discussion of the Word Address Register should be taken in conjunction with FIG. 2. It is the interpretation of the various bit positions of the Word Address Register by the control circuitry of this invention that provides the new and novel programmable selection between different types of magnetic storage devices.

Positions W–21, W–22, W–23 (FIG. 6a)are utilized to specify the selected drum system when Type I drum systems are to be selected, and are utilized as the Type Code, as indicated in the illustration of FIG. 2. The stages W–18, W–19, and W–20 (FIG. 6b) will be utilized alternatively as the Z Select portion of a Type I drum system selection, or as the actual drum system selection bits for Type II.

Stages W–16 and W–17 (FIG. 6e) will be used alternatively as the Y Select designator for the Type I drum system, and as the Z Select designator for the Type II drum system. The X Select designator for the Type I drum system is taken from stages W–13, W–14, and W–15. The stages W–14 and W–15 are used as the Y Select for Type II. For Type II drum systems, the X Select is taken from stages W–11, W–12, and W–13.

Finally, the selection must be made for the Angular Address bit positions. For Type I drum systems, stages W–00 through W–12 (FIGS. 6f—6j) are used, and for Type II drum systems, only stages W–00 through W–10 are used. From the foregoing, it can be seen that Type II drum systems require fewer bit positions in the total address since each has a small addressable capacity. The various distributions and interpretations of the various portions of the address will be discussed in more detail below.

In the consideration of the Word Address Register, it will be noted that there are stages in addition to those just described. For example, it will be noted that stage W–24 (FIG. 6g) is inserted between W–10 and W–11. For a Type II drum system W–10 is the highest bit position in the Angular Address. Accordingly, when the total count has been accommodated and it is desired to switch to the next higher order band, it is necessary to insert a predetermined wait to accommodate the switching. It is the function of W–24, in conjunction with its input circuitry, to perform this waiting function. In the event that a Type I drum system is being processed, this waiting period is virtually eliminated. A stage that serves a similar function for Type I drum systems is W–25 (FIG. 6f). It can be seen that it is the next adjacent stage to W–12; which is the highest-ordered bit position of the Angular Address for Type I drum systems. In a manner similar to that just described it provides the waiting function while the band is being switched. The stages W–26, W–27, and W–28 (FIGS. 6d and 6e) are utilized to control the timing requirements that are necessitated when there is to be a switching between drum systems in a continuous operation. These circuits will not be described in detail since they do not appreciably involve an understanding of the invention, through they are a part of the total circuit.

Drum Type Enable Logic.

Figure 6A:
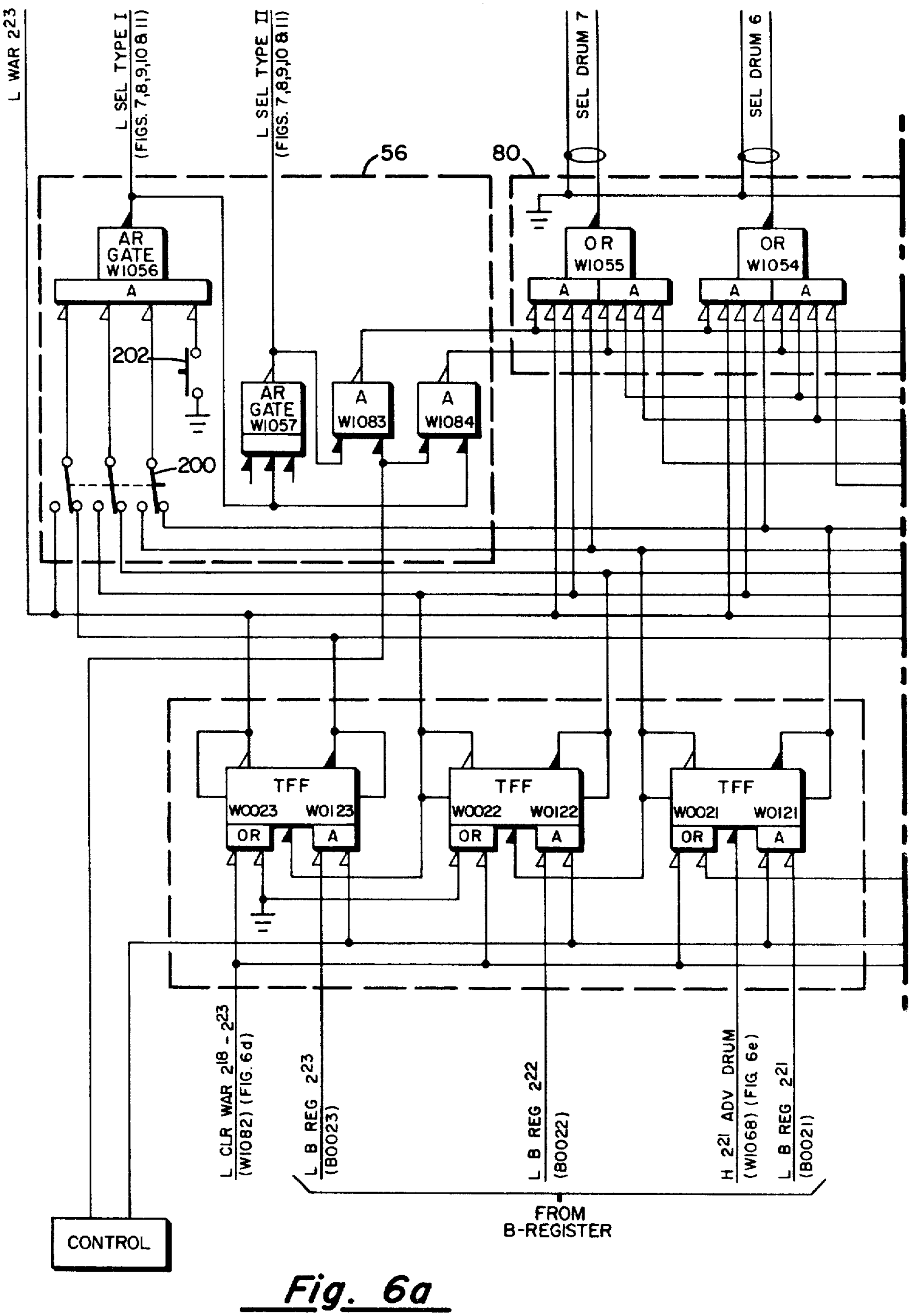
Figure 6B:
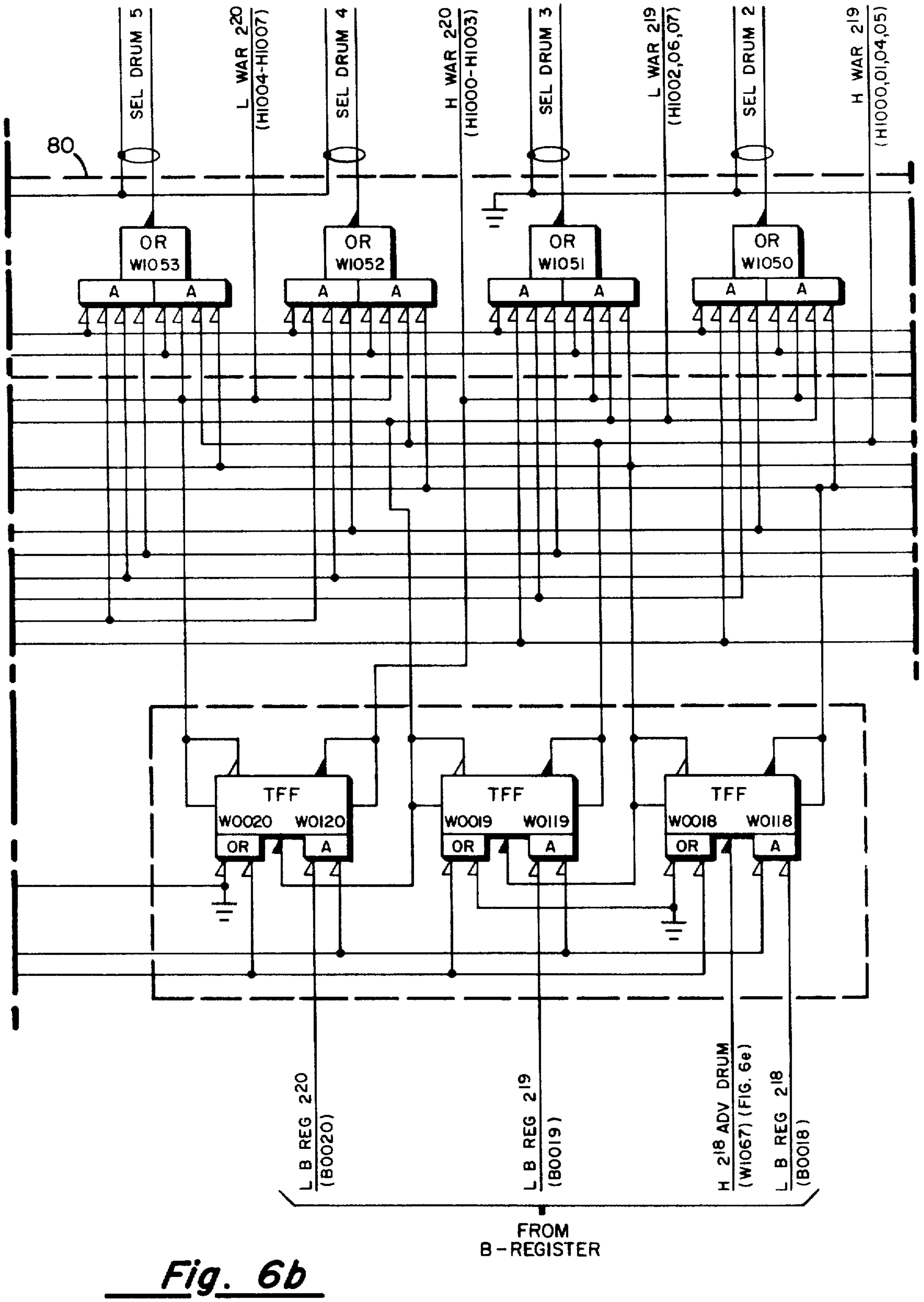
Figure 6C:
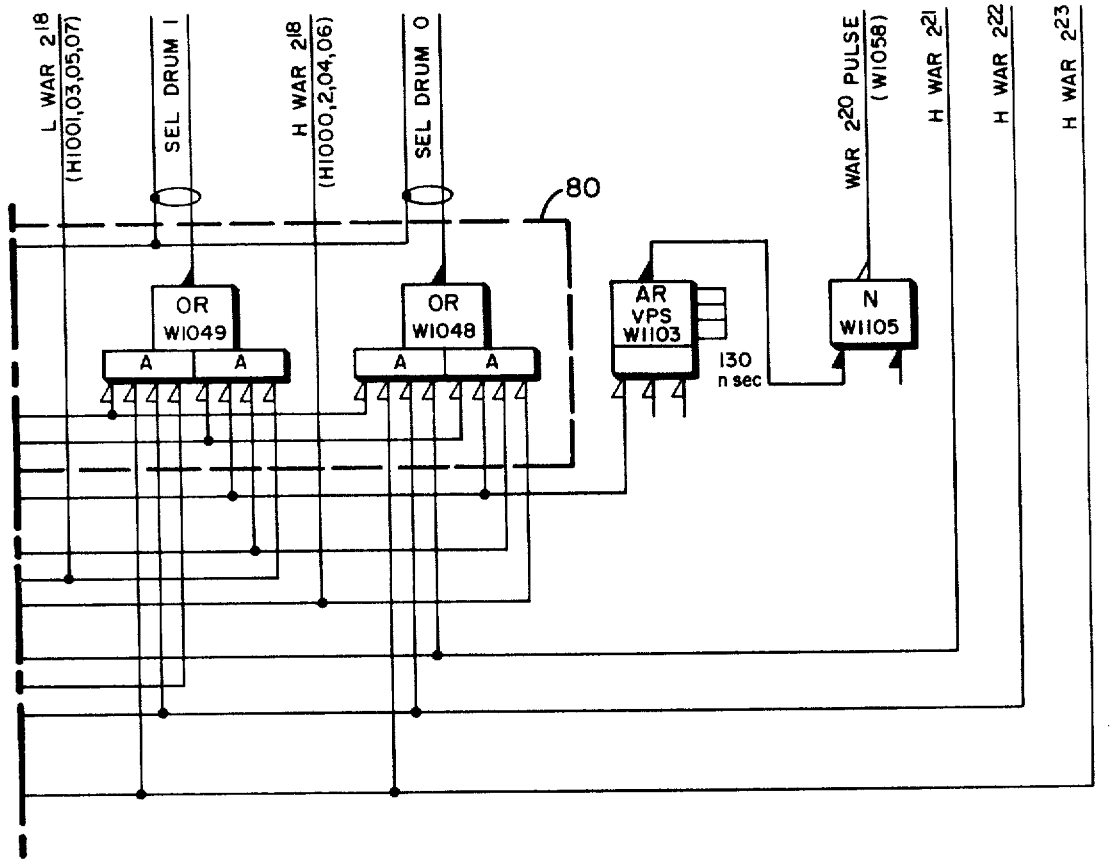
Figure 6D:
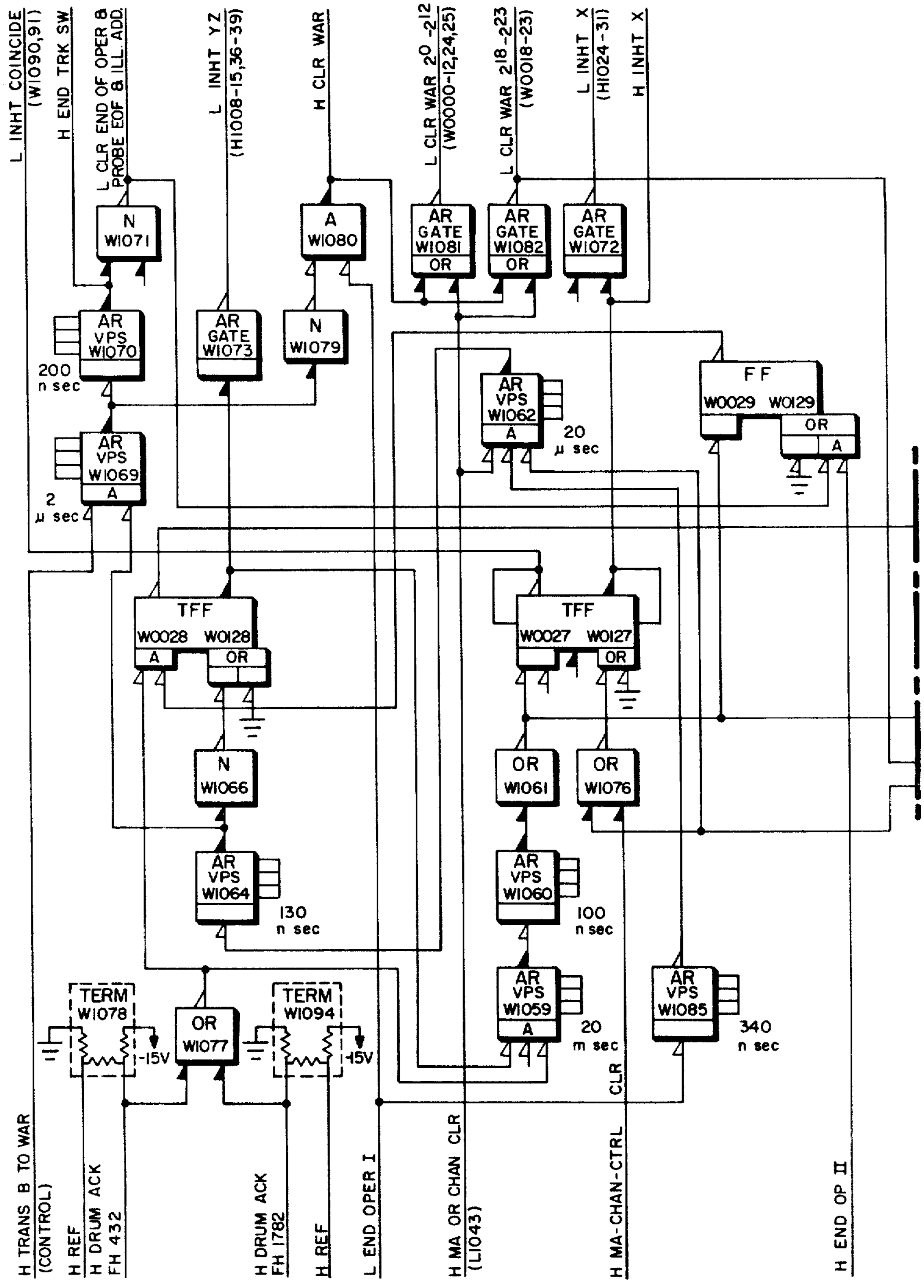
Figure 6E:
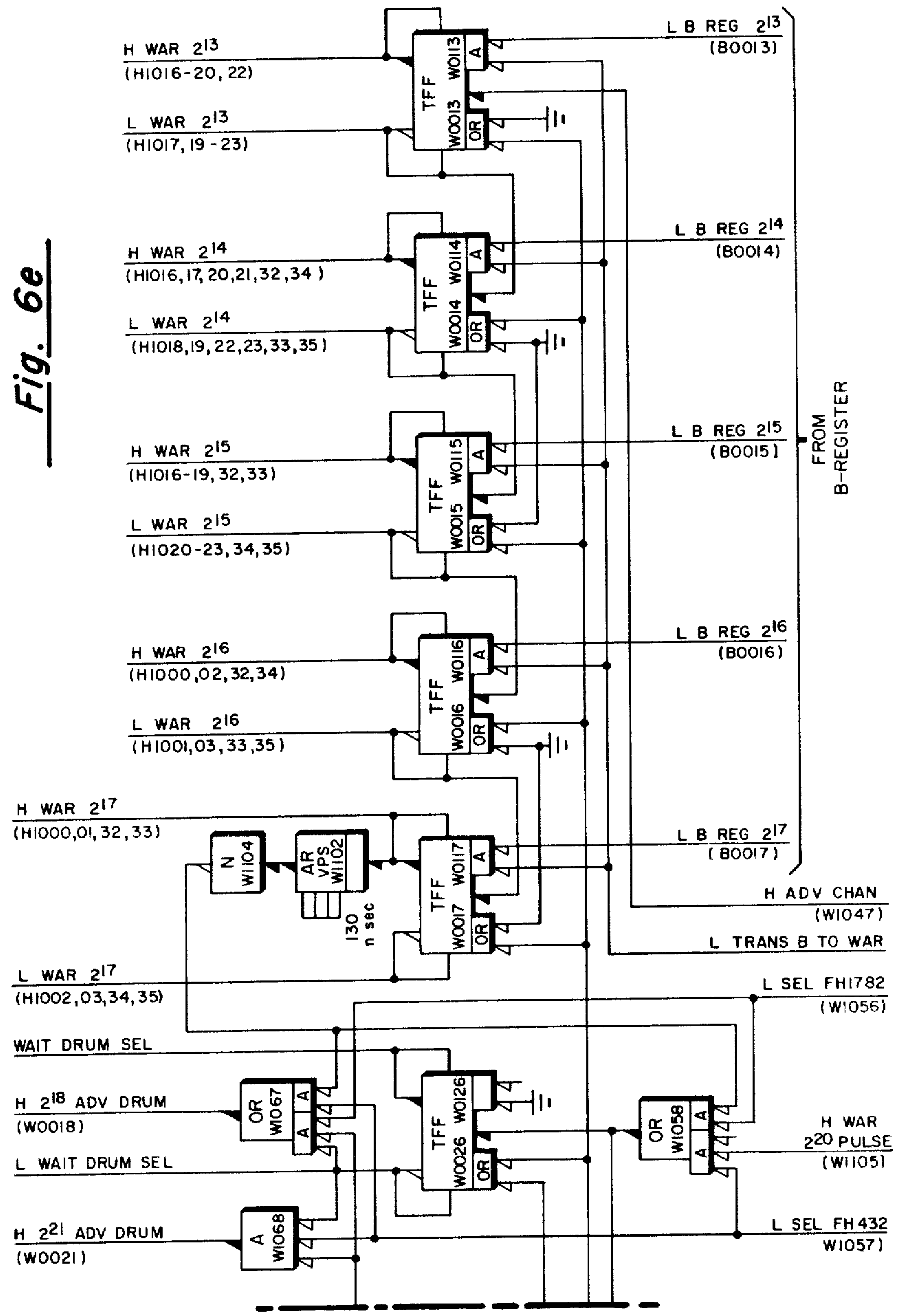
Figure 6F:
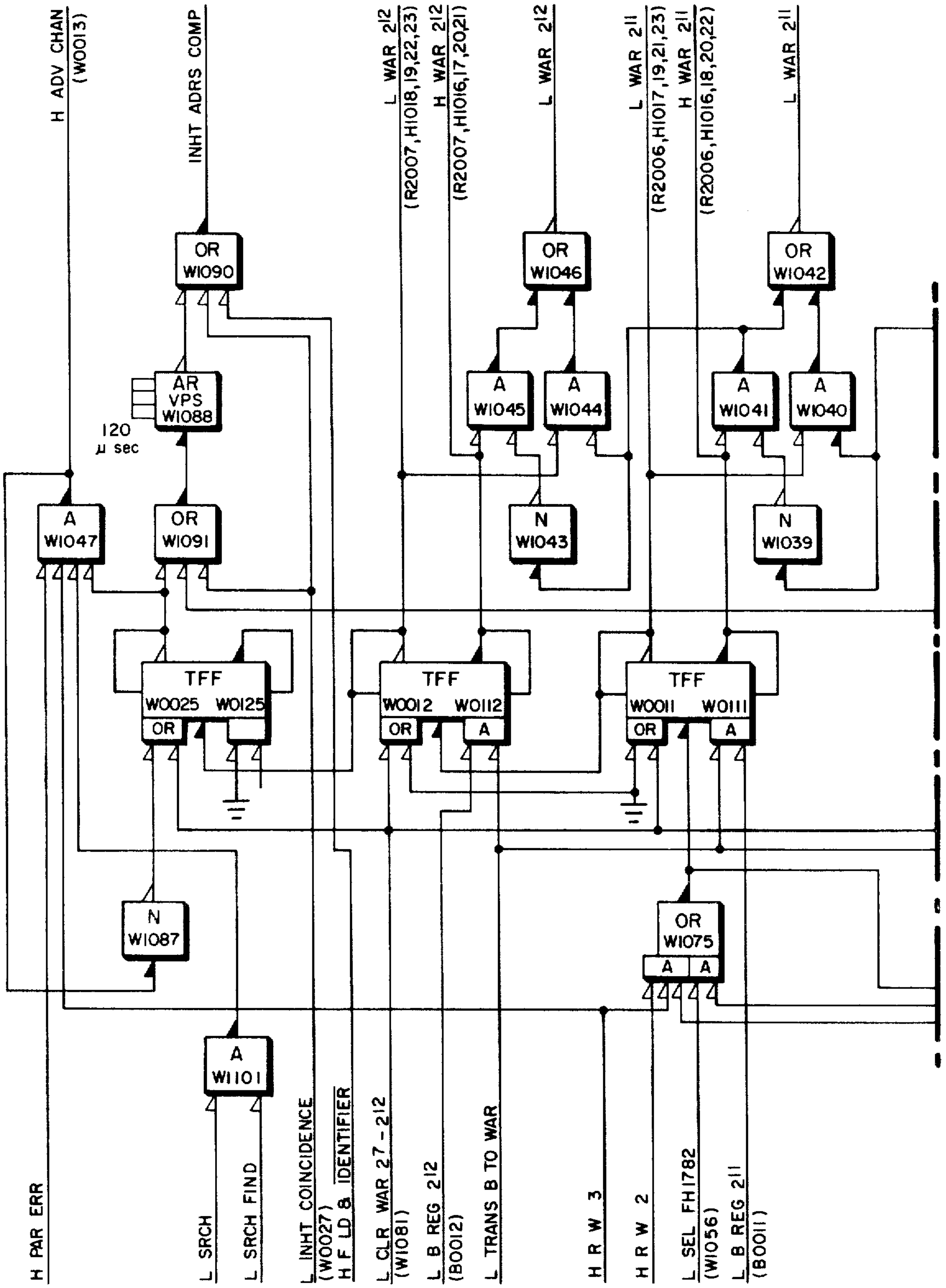
Figure 6G:
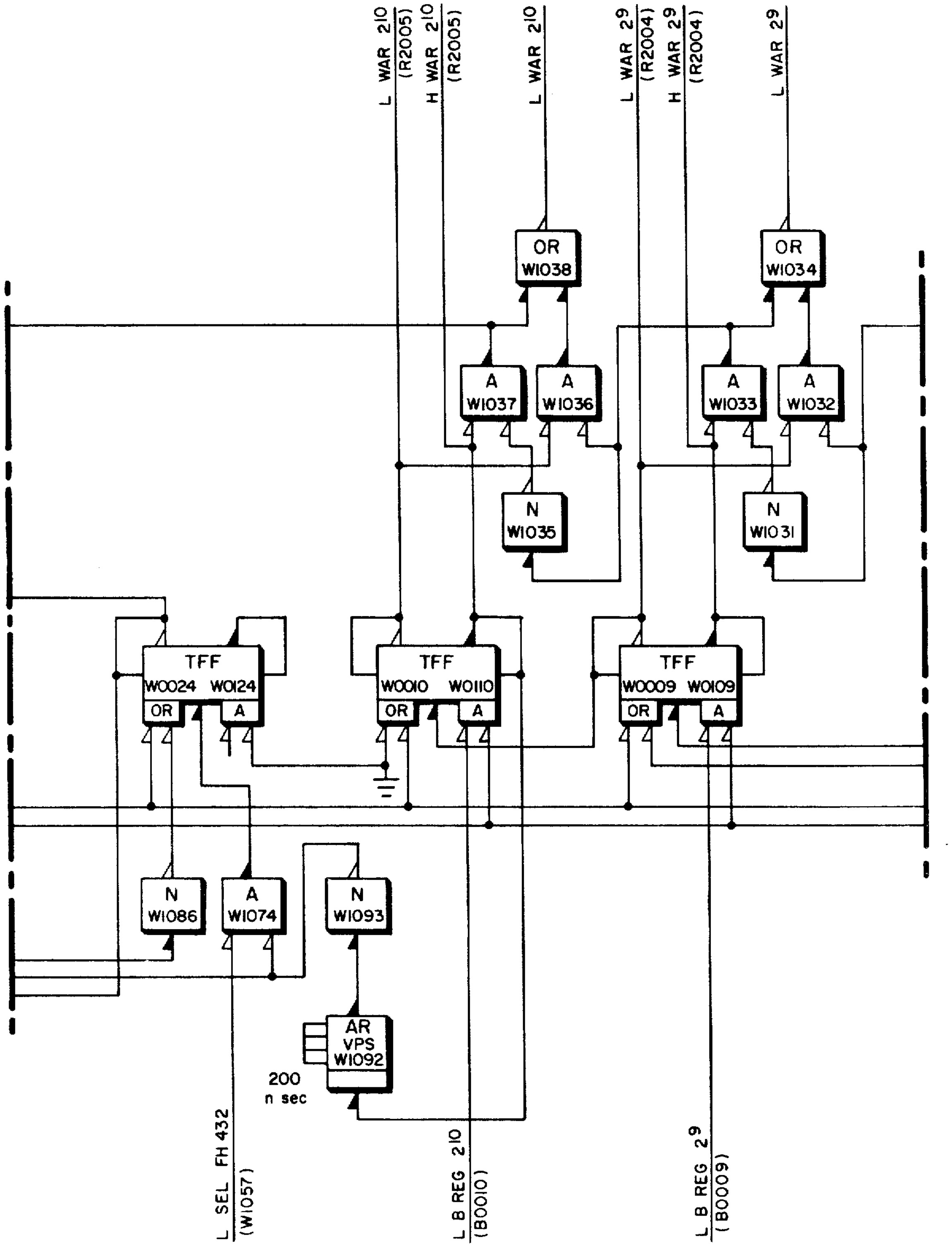
Figure 6H:
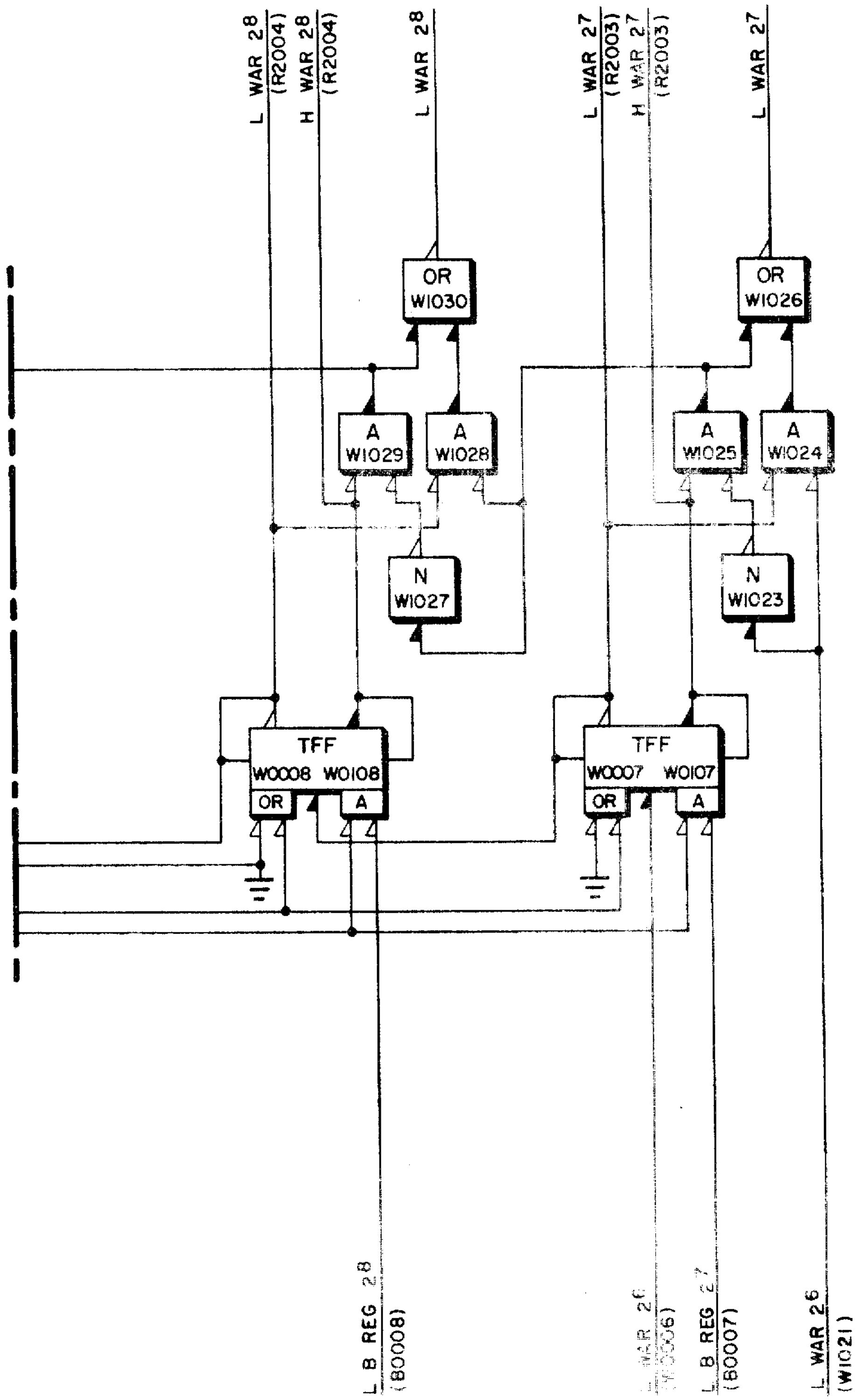
Figure 6I:
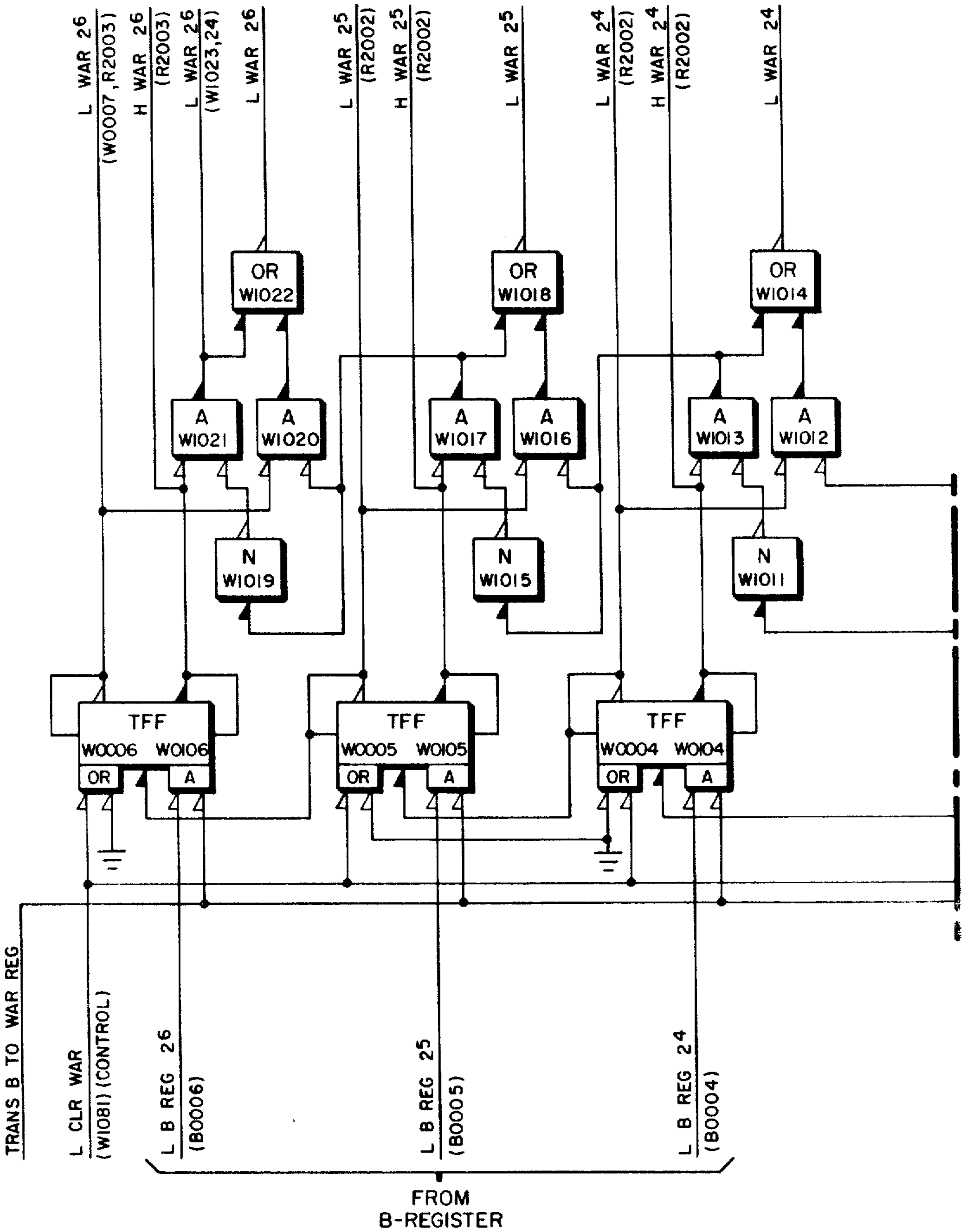
Figure 6J:
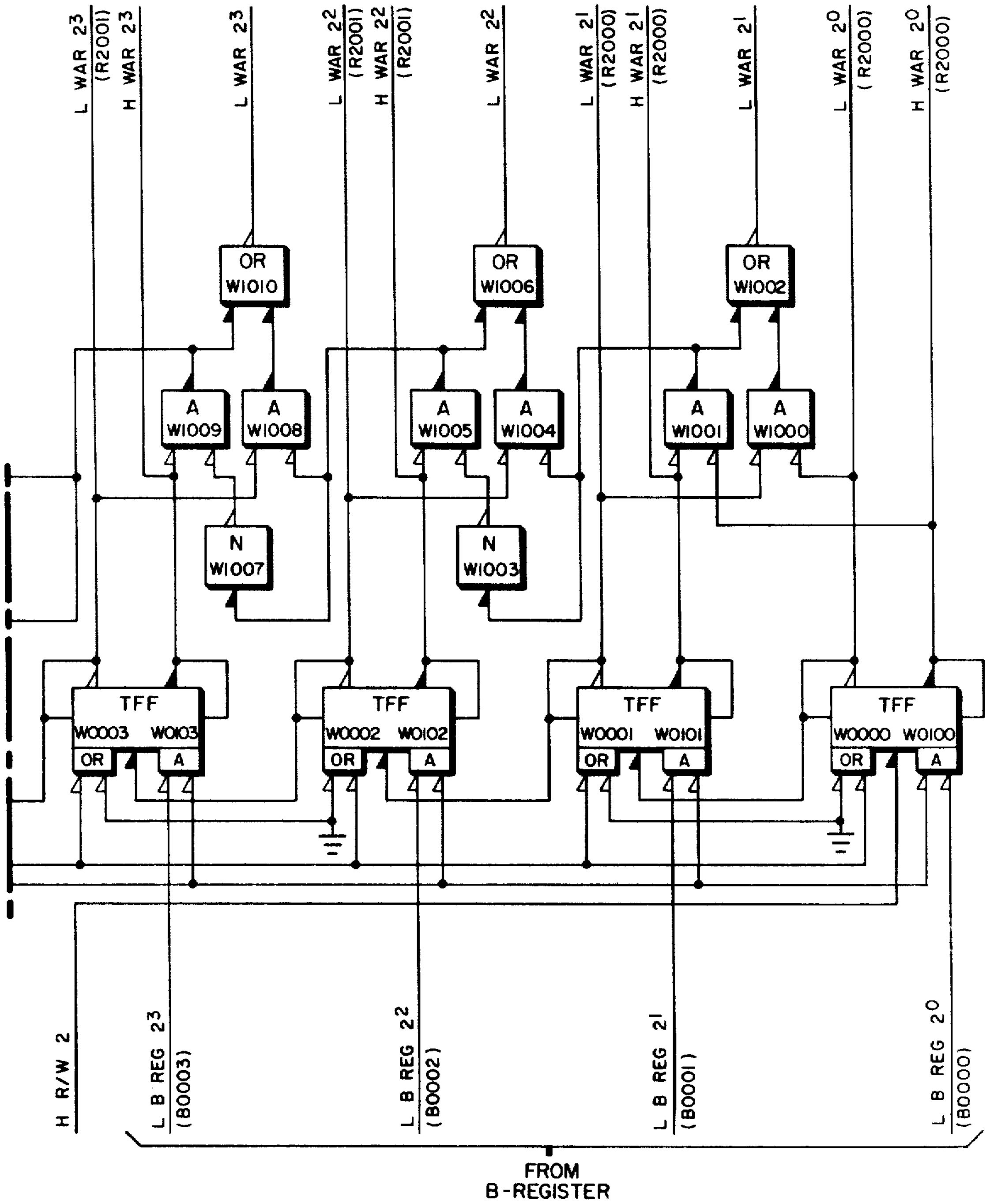

In FIG. 6a the circuitry shown enclosed within dashed block 56 comprises the Drum Type Enable Logic circuitry. It is in this circuitry that the various options described in conjunction with FIG. 4 can be selected. Between Option 1 and Option 2, the selection is by way of switch 200, which comprises a 3-pole double-throw switch. When switch 200 is in the rightmost position, as illustrated in the drawing in heavy line, Option 1 is selected. It can be seen that the input terminals to circuit W1056 are then connected respectively to the rightmost output terminal of Word Address Register stages W–23, W–22, and W–21. W1084 operates when enabled to select Type II drum systems, and W1083 operates when enabled to select Type I drum systems. Each of the circuits is enabled by a high signal. W1084 is controlled by the condition of W1056, and W1083 is controlled by the condition of W1057. Circuit W1056 requires low signals on each input terminal in order to provide a high signal at its output terminal, thus any high input will yield a low output. The W1056 output is directed as an input to W1057 and W1084. A low output signal from W1056 indicates a selection of Type I drum systems, will disable W1084, will cause W1057 to provide a high, and thereby W1083 will provide a low for selecting Type I drum systems. For the selection of Option 1, it can be seen that only under the condition when the stages each store a 0, will the condition be met that there are low output signals from the rightmost output terminals. When these low output signals are applied through switch 200 to the AND inputs of W1056, there will be a high output therefrom, thereby indicating a Type I drum system is not selected. The high output signal will be directed to the W1057 circuit, which operates to perform the selection for the Type II drum system; and, additionally, to W1084, which operates to gate the appropriate circuits in the Drum Select circuitry, shown enclosed within dashed block 80, for selecting a Type II drum system. With W1056 providing a high output signal, W1057 will be providing a low output signal, thereby indicating a selection of a Type II drum system. This high signal from W1056 will enable W1084, also. It will be seen further, that if any of the stages W0021, W- 22, or W–23 stores a 1 signal, the condition at the input of circuit W1056 will be such that a low output signal will result, thereby selecting the Type I drum system by directly disabling W1084 and enabling W1083 via W1057.

When the switch 200 is moved to the left position, shown in dashed line, Option 2 is selected. The result of moving the switch for Option 2, is that the leftmost output terminals from stages W–21, W–22, and W–23 are respectively coupled to the input terminals of W1056. As described above, W1056 will only provide a high output signal only when all input signals are low, thereby indicating a Type II drum system is selected. Therefore, only when the three stages in the Word Address Register store 1 signals will the selection be made at the output of W1056 of a high signal. This will indicate that a Type I drum system is not selected; and, after inversion by W1057, will indicate that a Type II drum is selected. For any case where any stage of W-21, W-22, or W-23 store a 0, the input conditions to W1056 will be such that a low output signal is derived thereby selecting a Type I drum system. Again, the actual selection is made by the action of W1083 and W1084. A high at the output of W1056 will enable W1084, thereby selecting Type II drum systems, and W1083 will be disabled by a low derived from W1057, thereby preventing the selection of Type I drum systems. A low at the output of W1056 will disable W1084, thereby preventing the selection of Type II drum systems, and W1083 will be enabled by W1057 providing a high input for making the selection of Type I drum systems. It should be noted that the signals required to gate the Drum Select circuits are actually derived from the one of circuits W1056 or W1057 that is not selecting, due to the inversion of logic levels.

For those options just described, it will be assumed that switch 202 has been left open. When switch 202 is closed, thereby connecting a ground potential (a high signal) to one of the input terminals of W1056 the circuit will be put in a forced condition. The forced condition is Option 3 and results in W1056 being forced to provide a low output signal irrespective of the value stored in the Word Address Register. This will provide the automatic selection of Type I drum systems.

The foregoing discussion has indicated a switch setting for providing the options selection. It should be understood however, that the selection could equally as well be made by physically providing jumper wires between the terminal connections from W1056 to W-23, W-22, and W-21. Similarly, the selection could be made by way of electronic switches with the additional requirements of control switching signals to provide the switching between terminals.

It is the output signals derived from circuits W1056 and W1057 that are fanned out throughout the circuitry to provide the various selection controls necessary to give the access control circuitry the capability of selecting between the two types of drum systems.

Drum Select.

The circuitry shown enclosed within dashed block 80 (FIGS. **6*a*, 6*b*, and 6*c*) provides the selection necessary to select the specified one of the eight selection lines in response to the appropriate signal combination in the Word Address Register. It will be noted that the drum system of numbers is in a range of 0 through 7, thereby corresponding to the binary coding system. It can be seen that the Drum Select circuits W1048 through W1055 each having a pair of AND input circuits. These AND input circuits operate to AND low signals. Accordingly, it is necessary that a low signal be provided as the enabling gate. In this regard, the output signal from W1083, the Type I drum system enabling signal generating circuit, is directed to the leftmost input terminal of the left-hand AND circuit for each of the drivers. The output from W1084, the circuit indicating the selection of a Type II drum system, is directed to the leftmost input of the right-hand AND circuit of each of the driver circuits. Therefore, when a Type I drum system is selected, a low signal will be derived from W1083 and will enable the appropriate input signals to the drivers. Alternatively, if a Type II drum is to be selected, W1084** will enable a different combination of input signals from WAR.

The drum select code for a Type I drum system is taken from w-21, W-22, and W-23. The signals from these stages are directed to the Drum Select circuits 80 in the appropriate combinations, and are directed to the left-hand AND circuits. Therefore, when a Type I drum systems is selected, the enable derived from W1083 will provide for the selection of one of the eight output lines dependent upon the numerical code in the Word Address Register stages. For example, if a Type I drum system is to be selected, and it is designated as Drum 1, it can be seen that W-21 will provide a low signal on its leftmost output terminal which will be coupled as the rightmost input to the left-hand AND for W1049. The rightmost output terminals of W-22, and w-23 will also be hooked to the left-hand AND circuit of W1049. Since both of these stages will store 0 during the specification of drum 1 (001), these output terminals will also be providing low output signals. Therefore, when enabled by a low signal derived from W1083, the circuit W1049 will provide a selection signal to select drum system number 1. By examining all other combinations it can be seen that no other circuit in the Drum Select circuit 80 will be selected.

For the condition when a drum Type II drum system is to be selected, stages W-18, W-19, and W-20 are used as the drum select stages. The output signals from these three stages are directed in the proper combination to the right-hand AND circuits in the Drum Select circuits 80. In a manner similar to that described for Type I drum systems, it can be seen that if Drum 1 is to be selected, that only the right-hand AND circuit to W1049 will have the conditions satisfied of receiving all low input signals. No other circuit in the Drum Select circuits 80 will be so conditioned. Accordingly, the selection will be made of Drum 1. Other examples can be traced through the wiring with the result that the numerical value in the Word Address Register will be translated to the equivalent drum select line.

Angular Address Register.

Figure 7:
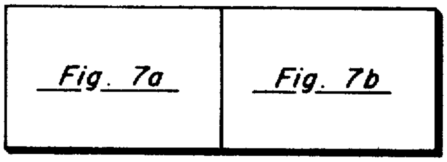

FIG. 7 illustrates the arrangement FIGS. **7*a* and 7*b*, which are the logic that comprises the Angular Address Register, referred to as 70 in FIG. 1. Basically, the Angular Address Register is comprised of a pair of double-rank shift registers. The lower rank is referred to as the Q rank and the upper rank is referred to as the R rank. When the Angular Address signals are read from the drum, they occur serially two bits at a time. As described in Pat. No. 3,355,718 the signals read for logical 0 or logical 1 are distinguishable. The lower ordered bits of the Angular Address are directed to the input terminals of Q-00, and the upper ordered bits of the Angular Address are directed to the input terminals of Q-06. As indicated, the 0 signals are directed to the leftmost OR input and 1 signals directed to the rightmost OR circuit. As the pairs of Angular Address bits are read to the Angular Address Register, they are shifted sequentially toward the higher-ordered stages. For each pair of bits so read, the control section provides a gating signal to transfer the contents of the Q rank to the R rank, and then from the R rank to the Q rank but shifted up one position. As described in conjunction with FIG. 2, a Type I drum system utilizes 13 bits to comprise an Angular Address, while Type II drum system utilizes only 11 bits to designate an Angular Address. Since the Angular Address Register 70 must accommodate both formats, additional control circuitry is required. The circuits identified as R1000 through R1007** perform the additional control functions.

The Angular Address arrangements on the two types of drum systems are as shown in Table I.

| Type I | | Type II | |
|---|---|---|---|
| 12 | 13 | 0 | 0 |
| 11 | 5 | 11 | 5 |
| 10 | 4 | 10 | 4 |
| 9 | 3 | 9 | 3 |
| 8 | 2 | 8 | 2 |
| 7 | 1 | 7 | 1 |
| 6 | 0 | 6 | 0 |

TABLE I

Considering Type I Angular Addresses first, it can be seen that the Angular Addresses are comprised of 13 bits and reside in stages W-00 through W-12, as described above. All stages of the Angular Address Register, except the stage 13, are required to receive and store the Type I Angular Addresses. At this point, is should be pointed out that a 13th bit is used to denote a dead space on the drum in which data is not available for addressable storage. As the Angular Addresses count up from 0, they will overflow into the 13th bit position at the end of the normal storage area. Therefore, when there is a signal store in the 13th stage of the Angular Address Register it indicates that no reading or recording can occur until the drum has preceded to the start of the recording area.

Next considering the Type II drum system, it can be seen that the Angular Address is stored in the Word Address Register stages W–00 through W–10. Referring to Table I it will be noted that the first two bits received in parallel are 0. The next ordered bits appear in the same format as that shown in the Type I system. Accordingly, when an entire Angular Address has been read in from the drum selected, the higher ordered stages will be automatically held at 0 for the Type II drum system.

The operation of the Angular Address Register is divided into the two halves for receiving the pairs of Angular Address bits in a serial fashion. The operation of this type of double-rank shift register is well-known in the art, and is fully explained in the above identified patent. The highest and lowest stages are shown with the intermediate stages being identical in construction, but shown in block form only.

The Angular Address Register provides one of the sets of input signals to the Interlace Logic 72 (see FIG. 1). The Interlace Logic will not be described in detail here, since it does not add to an understanding of the invention. For a description of the basic function of an interlace system, attention is directed to the discussion in the above identified patent, which describes a programmably alterable interlace system. Basically, the function of the Interlace Logic is to permit the effective spacing of sequentially addressable storage locations around the surface of a drum. For an example, an interlace of 1 would be essentially no interlace, and the consecutive addressable locations would be in physically consecutive locations around the drum. For such an arrangement, there would be a direct compare by the Comparator circuit shown in FIGS. 8*a* and 8*b*, of the Angular Address stored in the Angular Address Register with the Angular Address specified in the Word Address Register. For an interlace of two, the physical location of consecutively addressable storage locations would be offset by one physical location around the surface of the drum. That is, address one would be displaced one storage location from address two and so forth around the drum. In a similar manner, interlaces of 2, 4, 8, etc. proceed to have larger and larger offset arrangements. The function of the interlace is to provide a larger degree of latency between consecutively addressable locations for providing a greater period of time to perform computations.

Figure 7A:
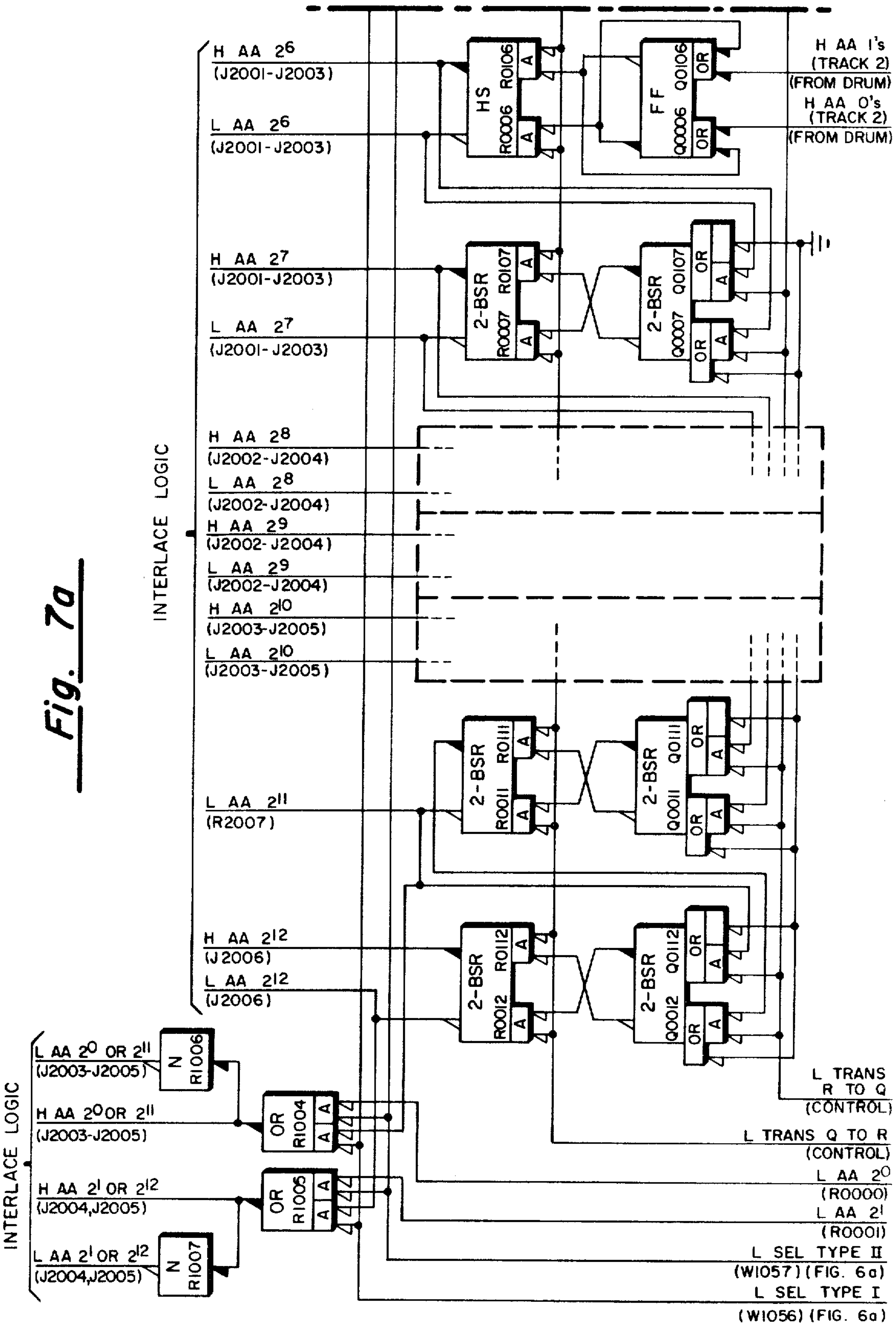
Figure 7B:
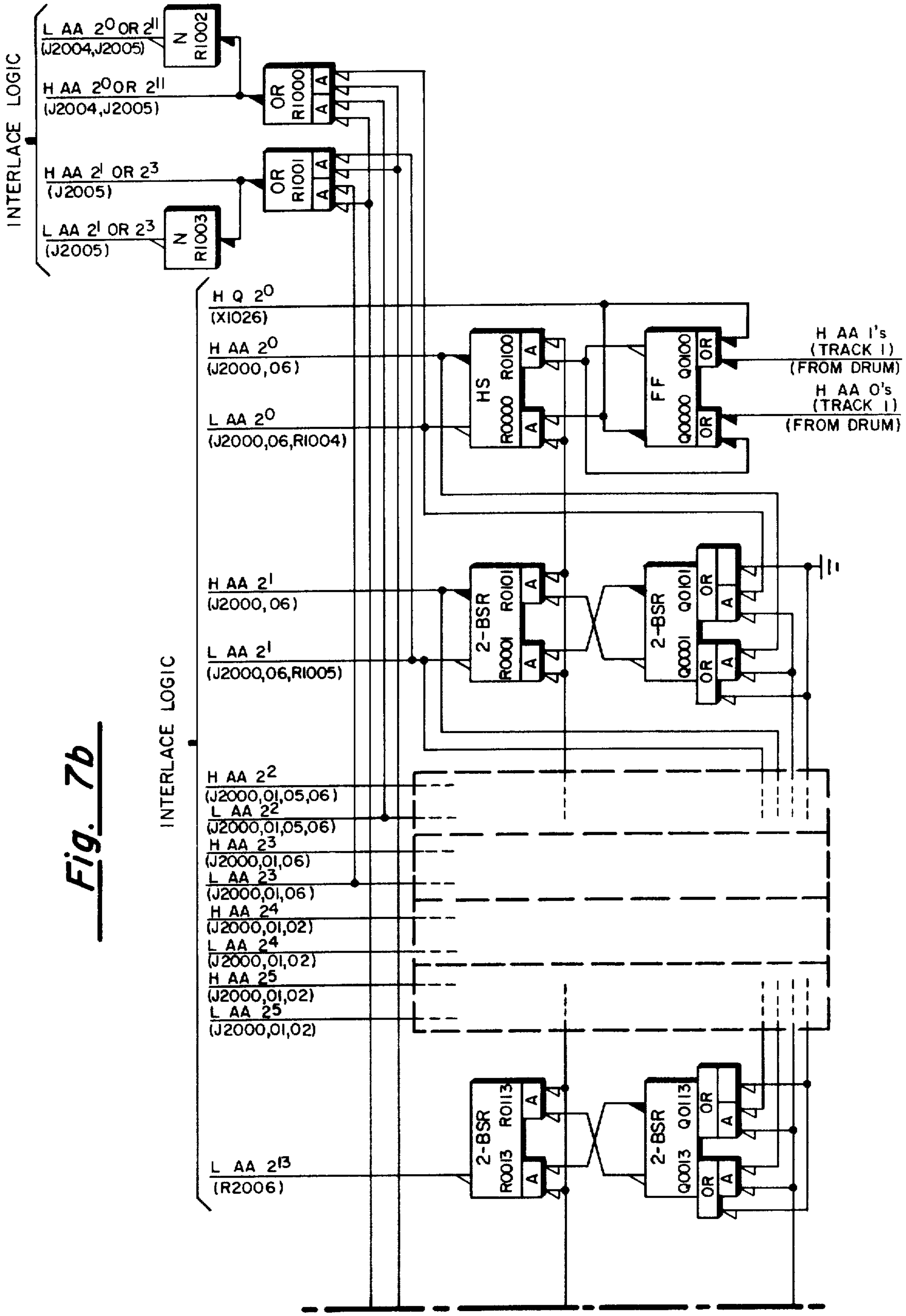

It is the function of the Interlace Logic, which is not shown in detail, to shift the Angular Address stored in the Angular Address Register by a predetermined amount, depending upon the interlace, for thereby providing a different effective value for comparison in the Comparator circuit, when comparing with the Angular Address stored in the Word Address Register. Since this shifting operation is essentially a circular type of shift, that is those higher-ordered bits that are shifted from the top are inserted in the lower-order stages so that no information is lost, it is necessary to accommodate the selection between a 13-bit Angular Address and an 11-bit Angular Address. Obviously, if a 13-bit Angular Address is to be shifted, the 11th bit must continue on upward in order, and is not the highest-ordered bit as it would be for the selection of Type 11 where only 11 bits are used in the Angular Address. The location of higher-ordered bit for the two types of drum systems provides the primary type of selection that must be made. Since the first two bits in the Angular Address for Type 11 are 0, their effective value would not alter the compare, however, it is necessary to determine whether 11 bits or 13 bits are going to be applied to the Interlace Logic. In order to accommodate a standard Interlace Logic arrangement, it is necessary that certain modifications be made in significance of the signals derived from the Angular Address Register as they are applied to the Interlace Logic. This selection of effective signal arrangement, is made in response to the Type I or Type II drum system selection (see FIG. 6*a*) by the circuits identified as R1000 through R1007 shown in FIGS. 7*a* and 7*b*. It is the function of these circuits to respond to the indicated bit positions of the Angular Address Register and to also respond to the selection of the type of drum system for selectively altering the order of application of the bits of the Angular Address to the Interlace Logic. The effective bit positions are identified on the drawing.

As mentioned above, it is the function of the Interlace Logic to shift the Angular Address bits into selected positions depending upon the interlace selection for comparison with the Angular Address stored in the Word Address Register.

Angular Address Compare.

Figure 8:
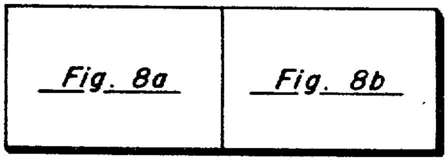
FIGS. 8*a* and 8*b*, when arranged as shown in FIG. 8, are a logical block diagram of the Angular Address Comparator circuitry.
Figure 8A:
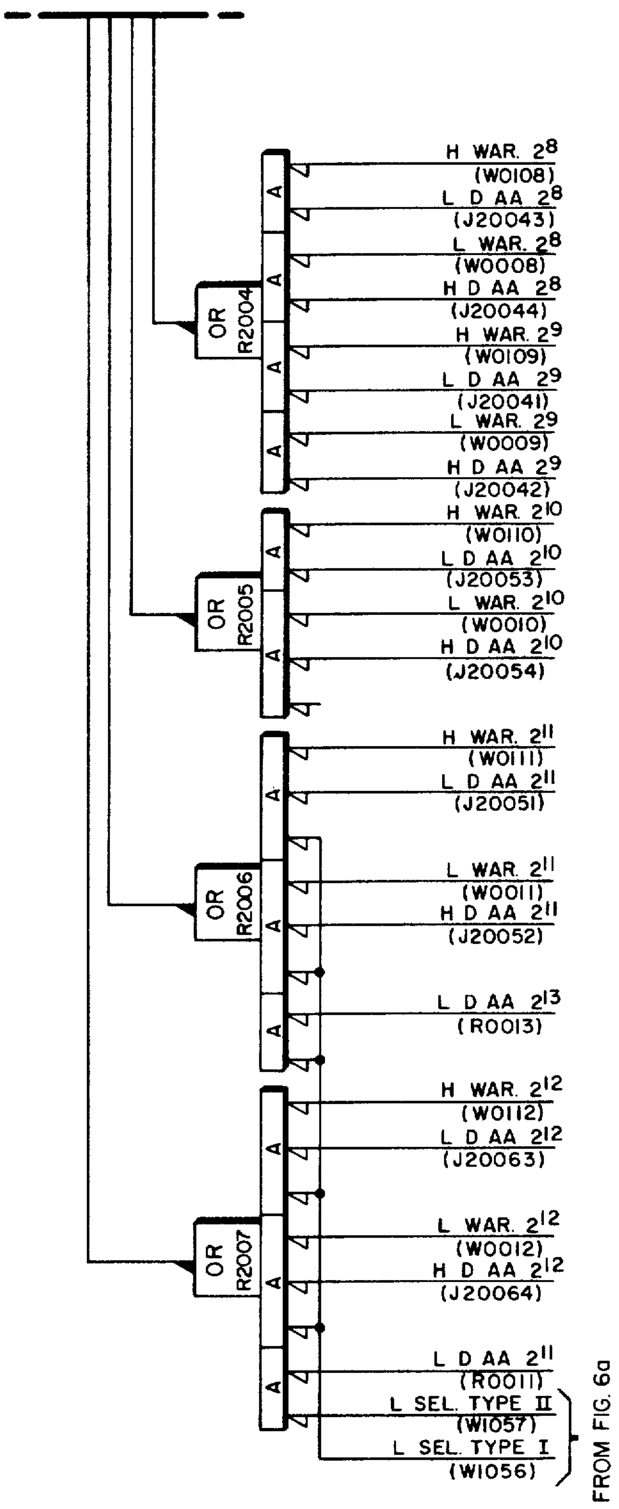
Figure 8B:
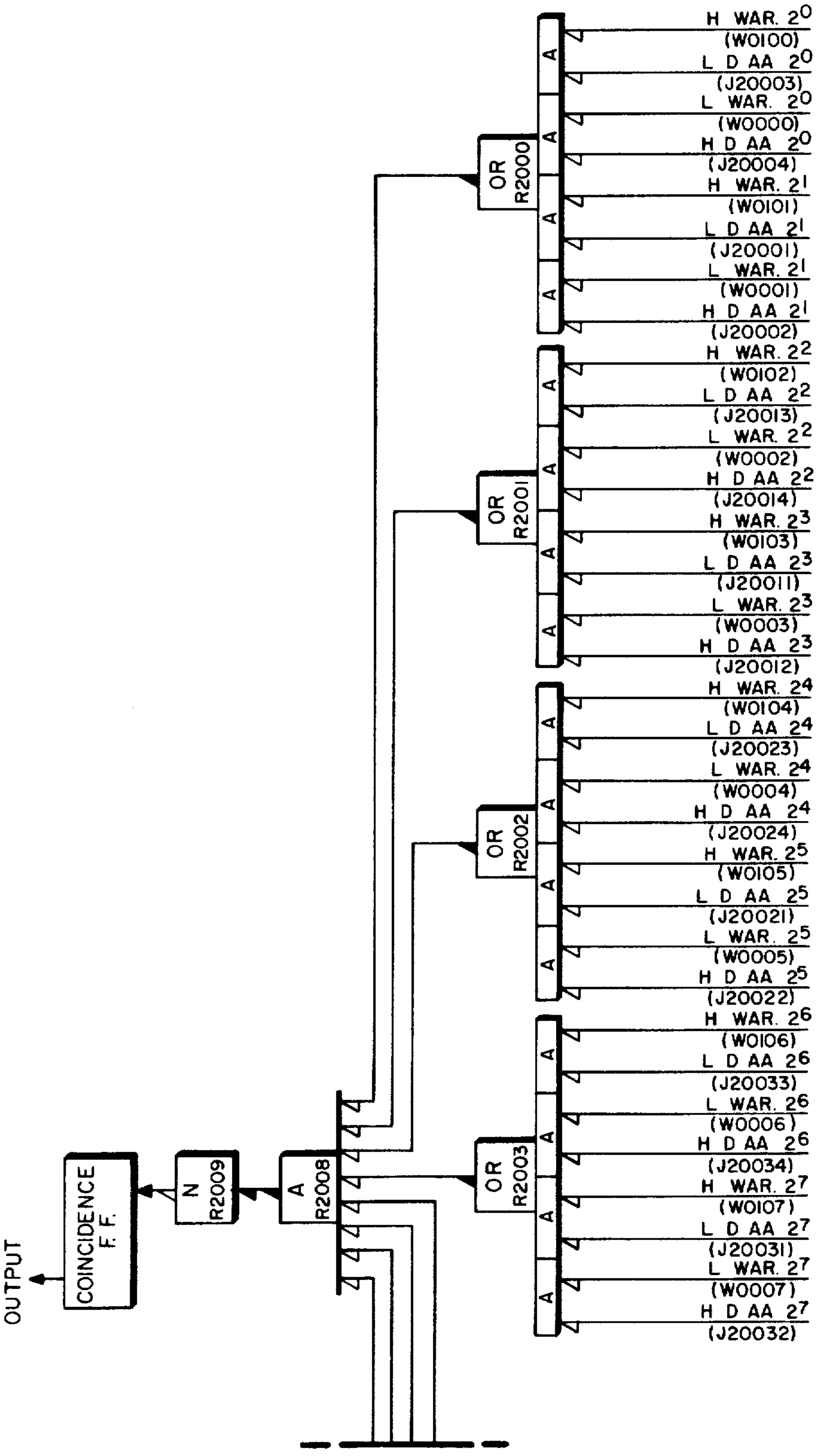

FIG. 8 illustrates the arrangement of FIGS. 8*a* or 8*b*, which are the logic circuits, identified as Comparator 68 in FIG. 1, utilized in comparing the shifted Angular Address bits derived from the Interlace Logic (not shown) and the bits of the Angular Address derived from the Word Address Register. Logically the function of the Comparator circuit is to detect when there is coincidence between the bits of the Angular Address, as read from the drum and shifted for interlace, and the Angular Address specified in the Word Address Register. When coincidence is detected, the drum is in the appropriate location for executing whatever function has been selected. The basic comparison is accomplished by circuits identified as R2000 through R2008, with a circuit R2009 providing negation of the output signal for setting the Coincidence flip-flop. The output of the Coincidence flip-flop is utilized to trigger circuitry (not shown) and indicate that the functions can proceed since the appropriate address has been located. It will be noted that the selection between Type I and Type II drum systems is also made in the Comparator circuit. It will be noted that the gating selection between Type I and Type II drum systems is accomplished in circuits R2006 and R2007. The input signals supplied to R2000 through R2005 are derived directly from the Word Address Register stages W–00 through W–10, and these stages are common to both types or drum systems. The other input signals directed to the circuits R2000 through R2005 are derived from the Interlace Logic and are the effective bit positions designated on the respective input lines. The input signals directed to R2006 and R2007 are controlled by the type of drum system selected. For Type II, the only circuit enabled is the leftmost AND circuit for R2007, and provides for bit $2^{11}$ to be passed into the Comparator circuit. For Type I, stages W–11 and W–12 of the Word Address Register are gated into the Comparator circuit along with the signals derived from the Interlace Logic. Having made the selection, and gated the appropriate signals into the Comparator circuit, the circuit R2008 operates to provide the high signal when all input signals are low, thereby indicating a comparison condition has been reached. The circuit R2009 will invert the high signal and provide a low output for setting the Coincidence flip-flop. It is not believed necessary to describe and trace an example compare problem, since the Comparator circuit can be readily understood by an examination of the logic circuit diagram.

X-Select and Line Drivers

Figure 9:
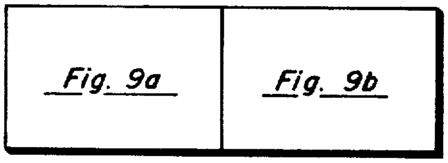
FIG. 9*a* and 9*b*, when arranged as shown in FIG. 9, are a logical block diagram of the select and Line Driver circuitry.
Figure 9A:
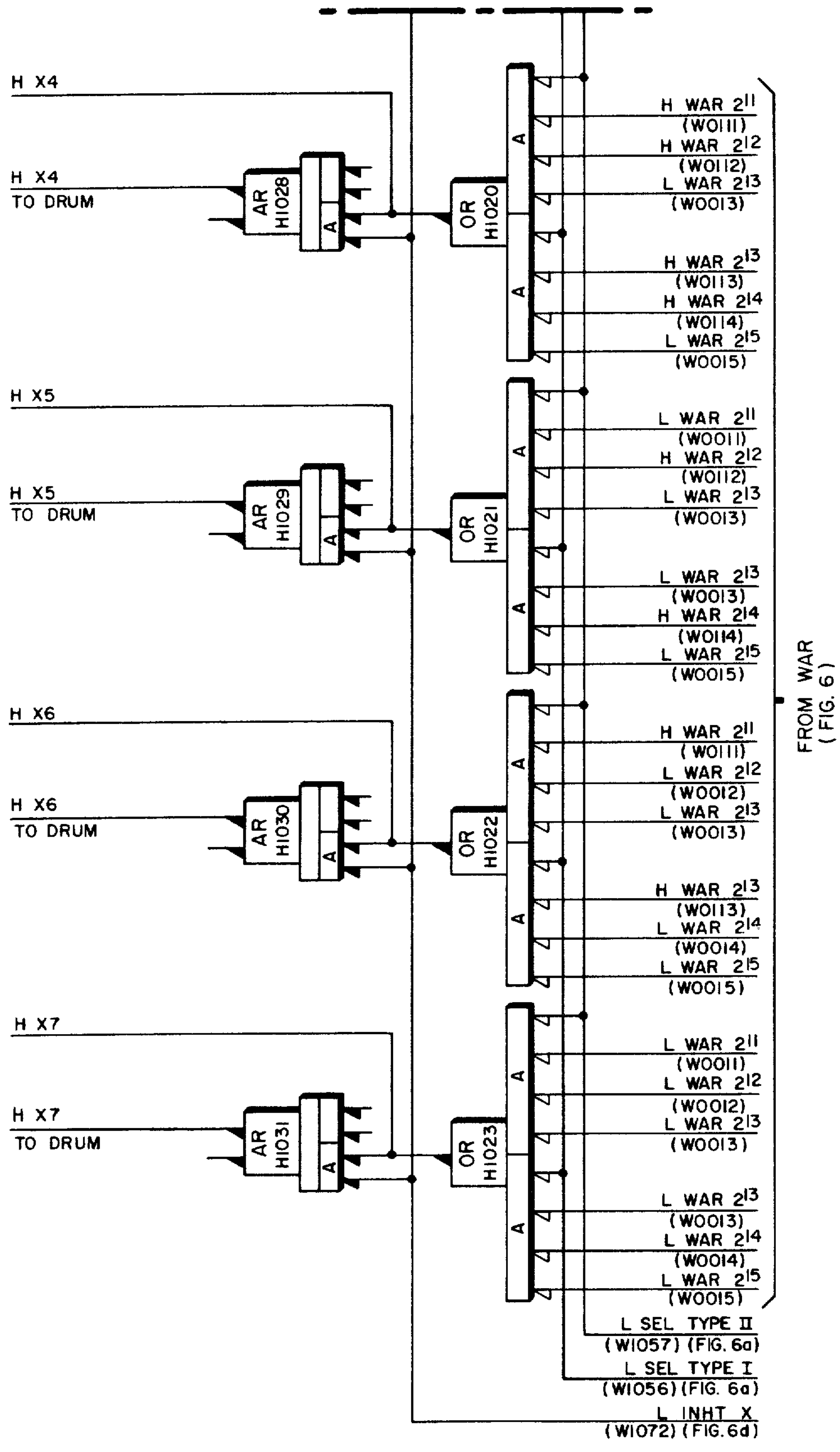
Figure 9B:
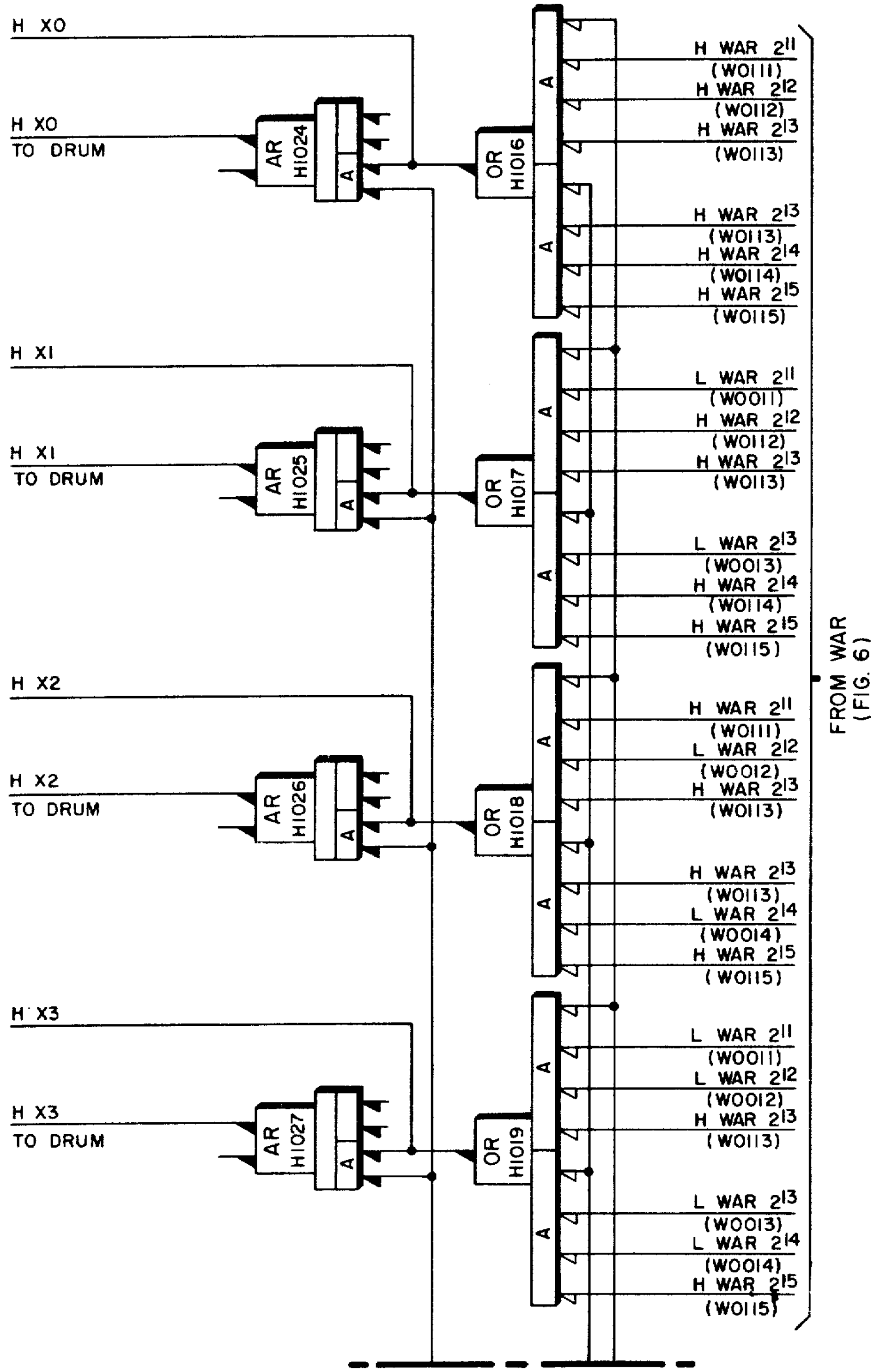

FIG. 9 illustrates the arrangement of FIGS. 9*a* and 9*b*, which are the circuit arrangement for the X-Select and Line Driver arrangement. The X selection is performed by the circuits identified as H1016 through H1023. It will be noted that the leftmost AND circuit at the input of each of these circuits is enabled by a Type I drum system selection signal, and the rightmost AND circuit at the input of each of these circuits is enabled by a Type II drum system selection signal. The other input signals to the X-Select circuits are derived from the various specified stages of the Word Address Register. In this regard, reference should be made back to FIG. 2 where it is illustrated that for Type I drum systems the stages of the Word Address Register for the X-Select are W–13, W–14, and W–15. Accordingly, it can be seen that the leftmost AND circuits in FIGS. 9*a* and 9*b* receive signals from the stages 13, 14, and 15 of the Word Address Register. Alternatively, for the Type II drum system selection, the X-Select bit positions are derived from stages W-11, W-12, and W-13 in the Word Address Register. It will be noted that there is overlap from the two types of selection at bit position 13. Again referring to FIG. 9*a* and 9*b*, then, it will be seen that the bit positions 11, 12, 13 are directed in the appropriate combinations to the rightmost AND circuits on each of the X-Select circuits.

The Line Drivers for the X portion of the channel addressing are comprised of circuits H1024 through H1031, and are driven by the X-Select circuits H1016 through H1023, respectively. The Line Driver circuits are held inhibited by a signal from the control portion (see FIG. 6*d*) on the Inhibit X line until such time as all of the translation has been completed and the signals are to be directed to the appropriate drum. At that time, the inhibit is removed and high signal is applied thereby enabling the appropriate one of the eight X lines to be driven.

X-Select and Line Driver

Figure 10:
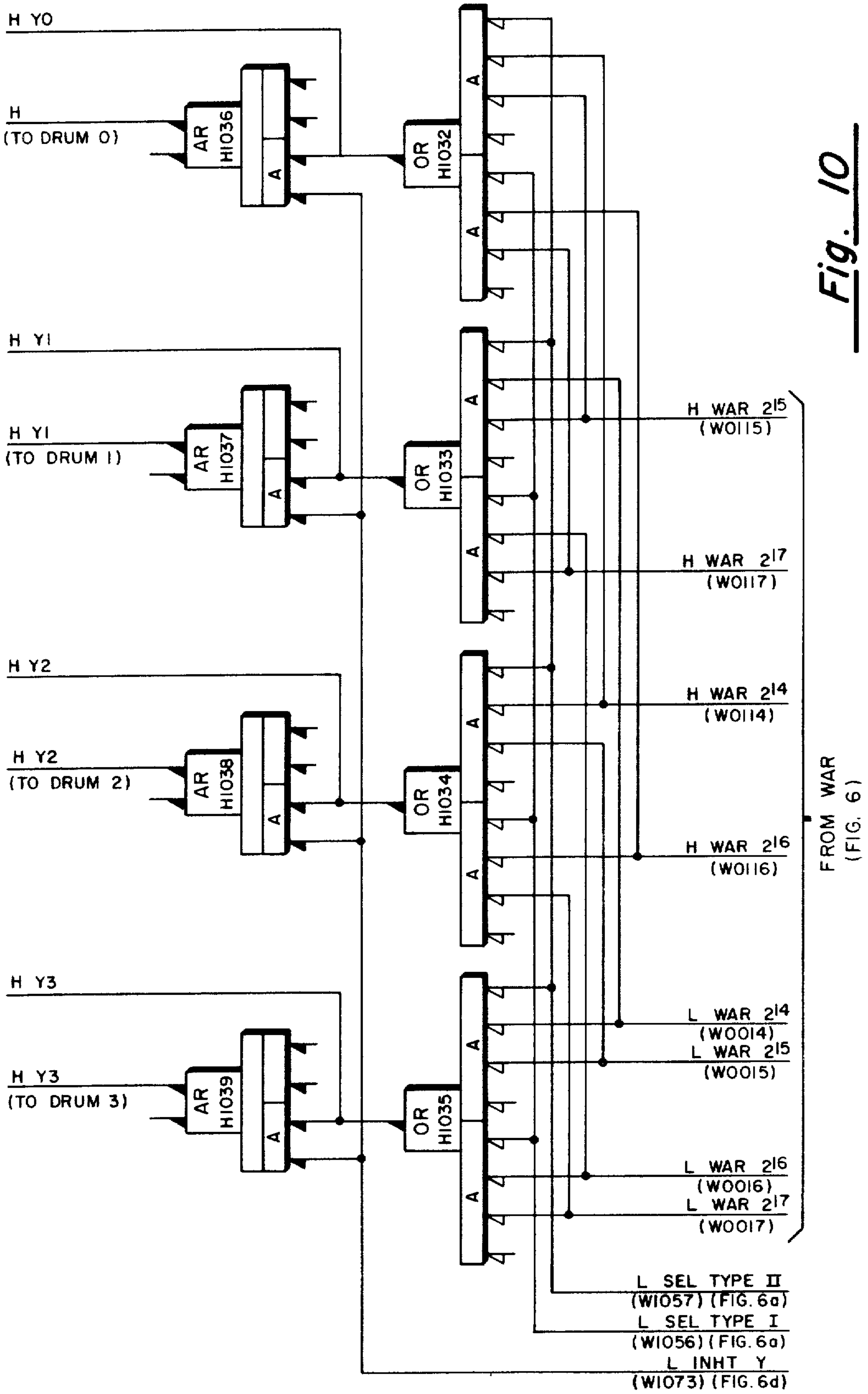
FIG. 10 is a logical block diagram of the Y-Select and Line Driver circuitry.

FIG. 10 illustrates the logic arrangement of the X-Select and Line Drivers. Again, reference should be made to FIG. 2 for the bit-position arrangements for the Y-Select portion, between the two types of drum system selections. The Y-Select circuits are identified as H1032 through H1035. Again, the leftmost AND circuit at the input of Y-Select circuits are enabled by the Type I drum system selection, and rightmost AND circuits are enabled by the Type II drum system selection. For the Type I drum system, the leftmost AND circuits receive inputs in the appropriate combination from stages 16 and 17 of WAR, and for the Type II drum system the rightmost AND circuits receive inputs in the appropriate combination from stages 14 and 15 in WAR. The Line Drivers for the Y portion are identified as H1036 through H1039 and are driven respectively by the Y Select circuits H1032 through H1035. The Line Drivers are inhibited by a signal on the Inhibit YZ line (see FIG. 6*d*) until such time as the Y Select circuits have made the appropriate line selection. At that time, control enables the line drivers by providing a high signal on the Inhibit YZ lines.

Z Select and Line Drivers

Figure 11:
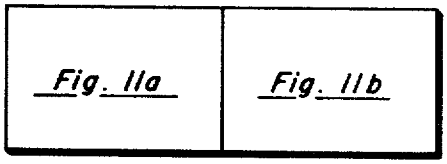
FIGS. 11*a* and 11*b*, when arranged as shown in FIG. 11, are logical block diagram of the Z-Select and Line Driver circuitry.
Figure 11A:
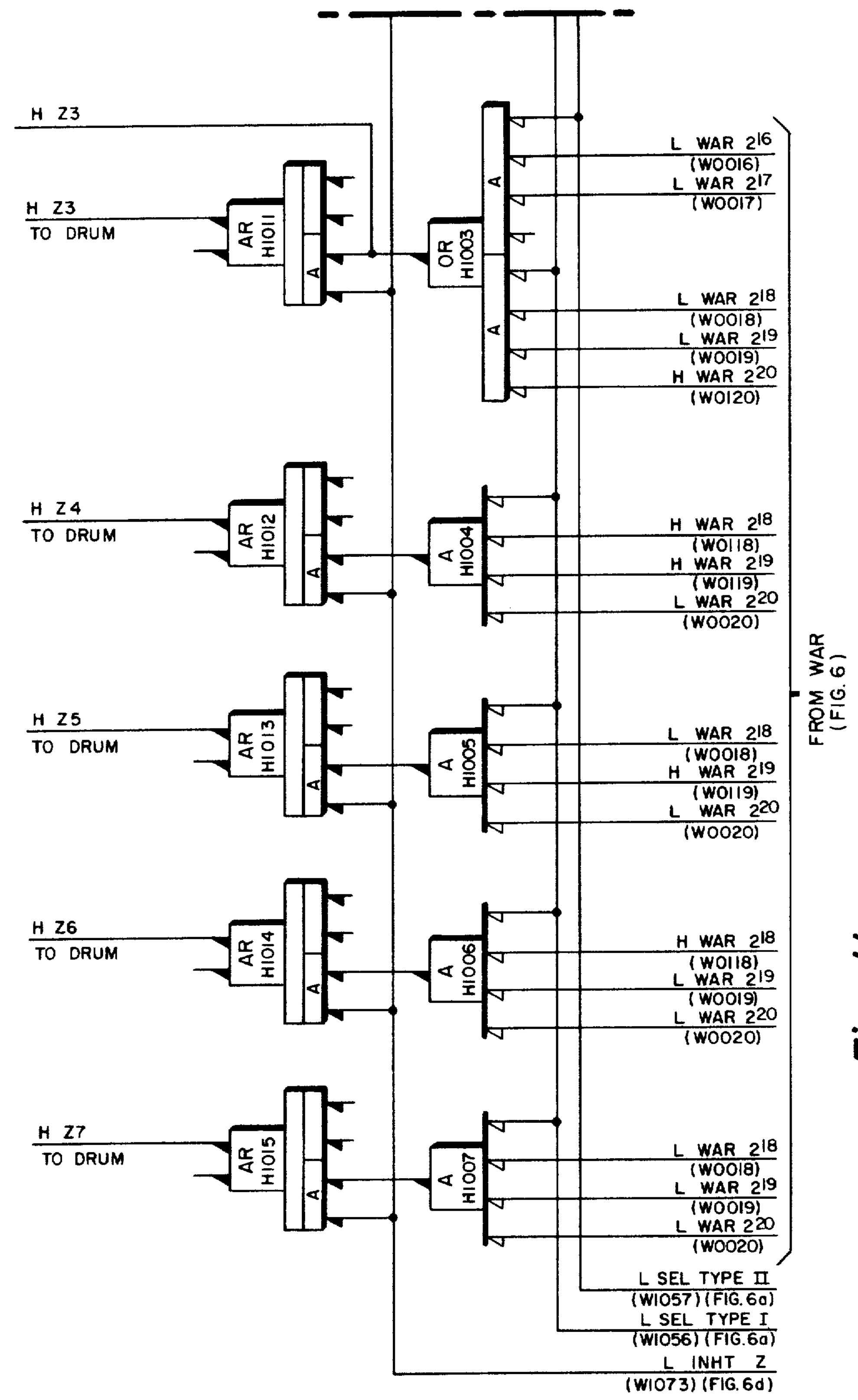
Figure 11B:
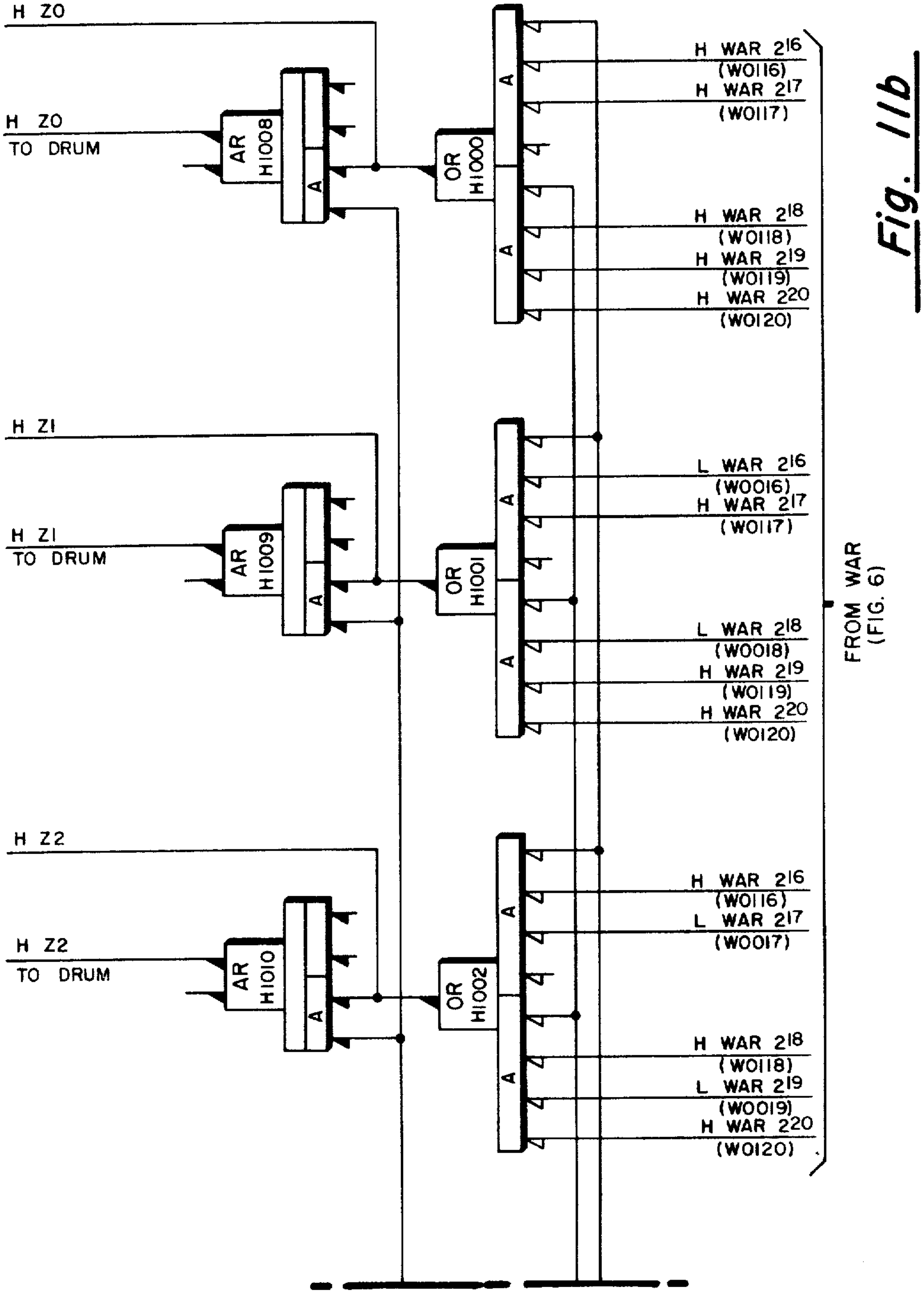

FIG. 11 illustrates the arrangement of FIGS. 11*a* and 11*b*, which are the logic circuit arrangement for the Z Select and Line Drivers. The Z Select circuits are designated H1000 through H1007. Again reference should be made to FIG. 2. The Z Select circuits arrangement is somewhat different from that of the Y or X Select situation in that for Type I drum systems, there are 3 bit positions in WAR utilized, namely, W-18, W-19, and W-20, while for the Type II drum systems, only two bit positions are utilized for designating Z Select code, namely, W-16 and W-17. Accordingly, the rightmost AND circuit for circuits H1000 through H1003 are enabled by the Type II drum system selection, while the leftmost AND circuits for these four circuits together with H1004 through H1007 are enabled by the Type I drum system selection signal. The rightmost AND circuits for H1000 through H1003 receive the appropriate combinations of input signals from the bit positions 16 and 17 in WAR for the Type II drum systems. The leftmost AND circuits for H1000 through H1003 and the circuits H1004 through H1007 receive the appropriate input combination from bit positions 18, 19, and 20 in WAR for making the Z Select operation for Type I drum systems.

The Line Drivers are comprised of a circuits H1008 through H10015 and are coupled to H1000 through H1007, respectively. The Line Driver Circuits are inhibited by a signal on the Inhibit Z Line (see FIG. 6*d*) until such time that it is desired to actually perform the Z Select operation for the appropriate one of the eight output lines.

From the foregoing general and specific descriptions of the improved access control unit, it can be seen that the various objectives summarized above have been met. An access control unit capable of communicating with two types of drum systems, and accommodating the two types of control words incident to the two types of drum systems has been described, and provides for access to the two types of drum systems over a single input/output channel for a data processor. Circuitry has been described for responding to a drum type selection for altering the effective application of the various bits in the control word to the access control circuitry. Control circuitry has also been described for responding to the drum type selection for conditioning the various portions of the access control unit to the different format of control words for the two types of drum systems. It is readily apparent that, though only two types of drum systems have been illustrated and described, more than two types could be accommodated by adding similar control circuits for responding to the other different types of drum systems selections.

Various modifications will become apparent to those skilled in the art without department from the spirit and scope of this invention. While the preferred embodiment of this invention has been illustrated and described, it will be understood that these are by way of illustration only, and that various changes or modifications may be made within the comtemplation of the invention. Therefore, what is intended to be protected by Letters Patent is defined in that appended claims.

I claim:

1. A data processing system comprising:

a plurality of memory devices of at least two distinct types having addressable storage locations thereon and unique addressing signal formats;

access control means coupled intermediate said plurality of memory devices and said programmable data processing means including register means for at least temporarily storing addressing signals to either a first or a second format;

memory device type decoding means coupled to a portion of said register means for providing memory type output signals indicative of the type of said memory device selected;

memory device type decoding means coupled to a portion of said register means for providing memory type output signals indicative of the type of said memory device selected;

memory device selection means coupled to said memory device type decoding means and to said register means for determining the one of said plurality of memory devices to be accessed; and address selecting means adapted to receive said type output signals and coupled to said register means for generating addressing signals unique to the type of memory device selected by said memory device selection means.

2. A data processing system as in claim 1 wherein said memory device type decoding means includes option selection means for selecting one of a plurality of options of address sequences for said plurality of memory devices.

3. a data processing system as in claim 1 wherein said plurality of memory devices includes at least first and second types of magnetic drum memory systems each of said types having different addressable memory capacities requiring said unique addressing signals, said unique addressing signals including a designation of an angular address position for defining the position around the periphery of said magnetic drum memory systems and the band position along said magnetic drum memory system, said angular address position and said band position designations requiring different addressing signal combinations for each of said types.

4. Access control means for use intermediate at least one programmable data processor and a plurality of addressable memory systems including at least two distinct types of rotating magnetic memory devices, any one of which can be coupled to a processor input/output channel, each of said rotating magnetic memory devices having angular address signals recorded therein for indicating the present positions of the rotating magnetic memory devices and data signals recorded in circumferential bands on the magnetizable surface thereof wherein said access control means includes:

first input means for receiving control words from the data processor, said control words comprised of a first plurality of control signals indicative of the programmably selected one of the types of the addressable memory systems to be coupled to the input/output channel, and a second plurality of control signals indicative of the desired addressable location in said addressable memory system, said second plurality of control signals including a first group of signals indicative of an angular address and a second group of signals indicative of a desired band;

register means having a plurality of stages coupled to said first input means for at least temporarily storing said control words;

memory system type enable means coupled to a first predetermined number of said plurality of stages of said register means for providing memory system type enable signals indicative of the type of said addressable memory system indicated by said first plurality of control signals;

memory system select means coupled to a second predetermined number of said plurality of stages and to said memory system type enable means for selecting a specified one of said plurality of addressable memory systems;

address select and driver means coupled to a third predetermined number of said plurality of stages and to said memory system type enable means for selecting a specified band in response to said second group of signals;

second input means coupled to the plurality of addressable memory systems for receiving angular address signals from the one of said memory systems selected;

angular address register means coupled to said second input means and to said memory system type enable means for receiving and at least temporarily storing angular addresses from said memory system selected;

comparator means coupled to said angular address register means, said memory system type enable means, and a fourth predetermined number of said plurality of stages for providing a coincidence signal when the angular address read from said memory system selected has a predetermined relationship to said first group of signals indicative of the angular address to be accessed; and said second, third, and fourth predetermined numbers of said plurality of stages dependent on said memory system type enable signals.

5. An access control means as in claim 4 wherein said memory system type enable means includes switchable option selection means for selecting one of a plurality of options of address sequences for said plurality of memory systems.

6. For use in a data processing system having at least one programmable data processor and at least two types of memory systems for storing data at addressable locations therein, an access control device for permitting the processor by programmable selection to communicate with selected ones of said types of addressable memory systems over a single input/output channel, said access control device comprising:

input means for receiving control words from the programmable data processor comprised of a first plurality of programmably alterable control signals indicative of one of said two types of addressable memory system selected and a second plurality of programmably alterable control signals indicative of a desired addressable location;

memory system type enable means coupled to said input means for interpreting said first plurality of control signals for providing memory system type enable signals indicative of the type of said addressable memory system selected; and address select means coupled to said input means and said memory type enable means for selecting the required effective significance of ones of said second plurality of control signals in response to respective ones of said memory system type enable signals for accessing the selected one of said types of addressable memory systems for accommodating the different addressing signal requirements of each of said types of addressable memory systems.

7. An access control device as in claim 6 wherein said memory system type enable means includes switchable option selection means for selecting one of a plurality of options of address sequences for said plurality of memory systems.

8. An access control device as in claim 7 wherein said option selection means includes means for selecting one of said options wherein only one of said types of addressable memory systems will be accessed.

UNITED STATES PATENT OFFICE
CERTIFICATE OF CORRECTION

Patent No. 3,568,160 Dated March 2, 1971

Inventor(s) Anthony R. Talarczyk

It is certified that error appears in the above-identified patent and that said Letters Patent are hereby corrected as shown below:

Column 16, line 35, "to" should read -- of --; line 37, beginning with "memory" cancel all to and including "selected;" in line 40, same column 16.

Signed and sealed this 7th day of September 1971.

(SEAL)
Attest:

EDWARD M.FLETCHER,JR.
Attesting Officer

ROBERT GOTTSCHALK
Acting Commissioner of Patents